(12) United States Patent
Knudsen

(10) Patent No.: US 11,709,051 B2
(45) Date of Patent: Jul. 25, 2023

(54) FENCE POST MEASUREMENT

(71) Applicant: N. Eric Knudsen, Maple Valley, WA (US)

(72) Inventor: N. Eric Knudsen, Maple Valley, WA (US)

(*) Notice: Subject to any disclaimer, the term of this patent is extended or adjusted under 35 U.S.C. 154(b) by 176 days.

(21) Appl. No.: 17/194,012

(22) Filed: Mar. 5, 2021

(65) Prior Publication Data

US 2021/0278207 A1 Sep. 9, 2021

Related U.S. Application Data

(60) Provisional application No. 62/986,521, filed on Mar. 6, 2020.

(51) Int. Cl.
| | |
|---|---|
| *G01B 21/22* | (2006.01) |
| *G01C 9/02* | (2006.01) |
| *E04H 17/26* | (2006.01) |
| *E04H 17/20* | (2006.01) |

(52) U.S. Cl.
CPC ............. *G01B 21/22* (2013.01); *E04H 17/26* (2013.01); *G01C 9/02* (2013.01); *E04H 17/20* (2013.01)

(58) Field of Classification Search
None
See application file for complete search history.

(56) References Cited

U.S. PATENT DOCUMENTS

| | | |
|---|---|---|
| 5,894,678 A | 4/1999 | Masreliez et al. |
| 6,658,753 B2 | 12/2003 | Tatarnic |
| 9,732,540 B1 | 8/2017 | Jansen |
| 2019/0316379 A1* | 10/2019 | Knudsen ............... E04H 12/347 |

* cited by examiner

*Primary Examiner* — Raul J Rios Russo
*Assistant Examiner* — Carl F. R. Tchatchouang
(74) *Attorney, Agent, or Firm* — Seed Intellectual Property Law Group LLP

(57) ABSTRACT

A system for measuring fence posts in a fence run includes a leading unit and a trailing unit. The leading unit includes a first measurement wire extending through a first rotary encoder and terminating in a second rotary encoder, a second measurement wire terminating in a third rotary encoder, and a third measurement wire terminating in a fourth rotary encoder, as well as a clamp to secure the leading unit to a fence post. The trailing unit includes a first rotary encoder to engage with the first measurement wire of the leading unit and a measurement wire terminating in a second rotary encoder, as well as a clamp to secure the trailing unit to a fence post.

20 Claims, 23 Drawing Sheets

FENCE POST MEASUREMENT

BACKGROUND

Technical Field

The present disclosure relates generally to fences and other upright structures such as handrails or guardrails, and more particularly to fence posts and systems and methods for taking measurements of fence posts within a fence run.

Description of the Related Art

Fences are ubiquitous in modern society, used in a vast range of applications, to mark and accent boundaries, provide security, and control movement of people and animals. Thousands of miles of new and replacement fences are installed every year in the U.S., and utilize vast amounts of construction-related natural resources.

FIG. 1 shows a landscape with a fence 100 extending along portions thereof. The fence 100 shown in FIG. 1 comprises two major segments, or runs, 102. A run is a section or portion of a fence that extends between natural dividing points such as corners, gates, buildings, etc. Except where a fence is attached to a building, each run 102 generally has a terminal post 104a at each end and line posts 104 spaced between the main posts. Each pair of adjacent posts 104 has a fence panel 106 coupled between them. Each panel 106 comprises horizontal elements, or rails, 108, and vertical elements, or fence boards, 110. Although each of the fence panels 106 are shown as straight sections with horizontal rails 108, it is appreciated that rails 108 may be installed at oblique angles relative to the posts 104 to adapt, for example, to various land topographies or obstacles.

Typically, fence construction and installation involves a number of steps. In some cases, a site survey is done to determine the precise location of the fence and to prevent the all-too-common (and potentially very expensive) occurrence of installing a fence a few inches or feet beyond the actual property line. A contractor visits the site to estimate the materials and labor required to build and install the fence. In addition to simply measuring linear feet required, elements such as topography and obstructions must be reviewed and accounted for. If the fence location has not been marked by the owner or surveyor, the contractor may mark the location during the initial visit, or during a later visit. Installation is scheduled, and materials are ordered and delivered to the site.

Depending on the scope of the project, the locations and spacing of the fence posts may be determined and laid out in advance, by a landscape architect, for example, or left to the installation crew to determine on site. In either case, the spacing of the posts is limited by the material available, and typically is selected to make best use of that material. For example, 96 inch lumber is commonly used to frame wooden fences, so the maximum distance between posts cannot exceed 96 inches. On the other hand, if the contractor uses 96 inch lumber, it would be wasteful to set the posts 60 inches apart, which would result in about three feet of waste from every framing rail. However, because of other considerations, some waste is unavoidable. It is generally preferable to evenly space the posts of a given run of fence, to provide an attractive and unified appearance. Inasmuch as such a run will rarely be evenly divisible by eight feet, each post will be something less than eight feet apart. Additionally, if the terrain includes changes in elevation which the bottom and/or top rail must follow, the length of the angled framing rails between two posts that are at different heights may be much greater than the lateral distance between the posts, which reduces the maximum permissible horizontal distance between any of the posts of that run. Furthermore, it can be difficult, or at least time consuming, to precisely position a post to within a fraction of an inch, so a margin of an inch or two is generally provided. Thus, the posts may be spaced anywhere from a couple of inches to a couple of feet less than the maximum allowable distance. Finally, when building fences from natural materials such a wood, it is not uncommon for individual pieces to be unsuitable, because of, for example, a knot in a position that unacceptably weakens a part, or an excessively warped board, etc. For all of these reasons, some material waste is expected and allowed for in the original estimate when calculating the materials for the frame rails, and, for similar reasons, when calculating materials for fence boards and posts.

Once the materials and crew are at the site, and with post locations marked, the post holes are dug, and the posts are installed. Each post hole may be partially backfilled with gravel to improve drainage, and the post is then stood in the hole and held in place by several stakes driven into the ground around the post and braces of scrap lumber nailed to the stakes and the sides of the post. A concrete footing is poured into the hole around the post and allowed to set, and the stakes are later removed. With all the posts in place and the footings set sufficiently to remove the braces, frame rails are cut to fit, and attached to the posts, extending between adjacent posts along the bottom and top of the fence. Fence boards are then cut to length and attached to the frame rails. Parallel and consistently spaced fence boards along the entire fence run is important, because differences in spacing will become very obvious to an observer when there is daylight behind the fence. Because of variations in the spacing of the posts, it is often necessary to rip fence boards lengthwise to maintain the correct spacing in some of the panels of a fence run. Additionally, the lengths of the fence boards may vary considerably. For example, the ground line between posts can have obstructions or changes in elevation that the installer adjusts for in the length of the fence boards in order to maintain a straight line at the top of the fence while still maintaining proper spacing or ground clearance at the bottom. Additionally, many fences include decorative features along the top, such as arches or waves, in which case the builder may extend the fence boards above the desired finish line, and cut the fence boards to follow the desired shape, after installation. The posts are also cut down to the final length after installation, and post caps or finials are often attached to the tops. After the fence is installed, it is usually painted or stained to protect the wood and extend its useful life.

If properly executed using good quality material, a fence that is built and installed as described above can be very attractive, and can last for many years. However, it will be noted that there is a significant amount of waste that is produced. Not only does such waste result in higher material costs, it increases shipping costs because it must be transported to the site and later removed, it increases landfill use and fees, and wastes otherwise valuable resources.

In view of the expense, labor, and waste associated with installing a fence that is custom-built on site, another method of building and installing fences has been introduced. Premanufactured fence panels are becoming more available, and increasingly can be found in a wide variety of materials, including wood, vinyl, composite, aluminum, steel, concrete, etc., and in a wide variety of designs.

Pre-manufactured panels or kits are typically sold from retail lumber and hardware outlets. The panels and kits are provided in standard sizes and are ready for installation. One common panel size, of the many available, is six feet tall by eight feet long. The installer digs the post holes at intervals of eight feet plus the width of a fence post, and places the first post, with stakes and braces to hold it plumb while the concrete sets, as described above. However, the installer also attaches the first fence panel to the post, and may attach the second post to the first panel at the same time, installing both posts together. The installer then progresses post-by-post, attaching a panel between each pair of posts before pouring the footing around the second of the pair, bracing each post and shimming up each panel to ensure that the post is held plumb and the fence level until the post footings are sufficiently hardened, which may be several days because of the mass of the fence being supported. This process ensures that the spacing between the posts is correct for the eight-foot panels. At the end of a fence run, if the last post is less than eight feet from the previous one, the installer cuts a fence panel to fit in the remaining space.

In contrast to site built fencing, pre-manufactured fence panels can be produced efficiently, inexpensively, and at a consistent, predictable quality. Because they are produced in a manufacturing facility, waste can be significantly reduced, and the waste that is produced is more likely to be recycled either internally to produce other products or externally rather than sent to a landfill. Material handling methods and automated machines for material optimization allow utilization of all lengths of raw materials. The factory can obtain lumber that has not been cut to standard lengths, but is the full length of the log, or stem, from which it was milled. Scrap that won't work on one fence panel or design can be diverted and used for another. Flaws and defective lumber can be detected automatically, and can often be cut out, allowing the remaining material to be salvaged. This optimization and defective-material/scrap management process is much more environmentally friendly than site-built fence processes, especially as it relates to reducing the production, and increasing the productive recycling, of waste lumber. As tree trunks don't come in perfect length increments, the factory can bring in material in lengths determined by the actual tree trunks and optimize those random lengths via computer to best utilize the material, and minimize waste. The panels can be primed or finished in spray booths or dip tanks in large volumes, using better quality control, wasting less material, and reducing or eliminating the environmental impact that arises from on-site finishing.

Overall, fences built using pre-manufactured fence panels can be made more efficiently, less expensively, and to higher and more consistent quality standards, with less waste and less environmental impact, than fences custom-built on site.

BRIEF SUMMARY

A system for measuring fence posts may be summarized as comprising: a first measuring unit including a first rotary encoder, a second rotary encoder, and a measurement wire, wherein the measurement wire extends through the first rotary encoder and has a first end that terminates within the second rotary encoder; a first clamp configured to secure the first measuring unit to a first fence post; a second measuring unit including a third rotary encoder, wherein the measurement wire has a second end configured to be coupled to the third rotary encoder; and a second clamp configured to secure the second measuring unit to a second fence post.

The first measuring unit may be a leading unit and the second measuring unit may be a trailing unit. The first rotary encoder may be configured to measure an angle of an axis that extends from the first fence post to the second fence post with respect to an outer surface of the first fence post. The second rotary encoder may be configured to measure a distance between the first fence post and the second fence post. The third rotary encoder may be configured to measure an angle of an axis that extends from the first fence post to the second fence post with respect to an outer surface of the second fence post. The first measuring unit may include a laser level unit and the second measuring unit may include a photodiode unit. The laser level unit and the photodiode unit may be configured to determine an elevation of the second measuring unit with respect to the first measuring unit.

A system for measuring fence posts may be summarized as comprising: a first rotary encoder; a first measurement wire that has a first end that terminates within the first rotary encoder; a second rotary encoder; and a second measurement wire that has a first end that terminates within the second rotary encoder; and a clamp configured to secure the system to a fence post.

The first measurement wire may have a second end that terminates at a hook. The second measurement wire may have a second end that terminates at a controller, wherein the controller has a button. The controller may have a groove configured such that a corner of a fence post can be seated snugly within the groove. The clamp may include a slide having at least one sliding jaw. The slide may be mounted to slide along two guide rods and to be actuated to slide along the two guide rods by a screw. The system may be configured to measure movement of the slide along the guide rods.

A system for measuring fence posts may be summarized as comprising: a rotary encoder; a measurement wire that has a first end that terminates within the rotary encoder; and a clamp configured to secure the system to a fence post. The measurement wire may have a second end that terminates at a hook. The clamp may include a slide having at least one sliding jaw. The slide may be mounted to slide along two guide rods and to be actuated to slide along the two guide rods by a screw. The system may be configured to measure movement of the slide along the guide rods.

A method of measuring fence posts may be summarized as comprising: clamping a first measuring unit to a first fence post, wherein the first measuring unit includes a first rotary encoder, a second rotary encoder, and a measurement wire, wherein the measurement wire extends through the first rotary encoder and has a first end that terminates within the second rotary encoder; clamping a second measuring unit to a second fence post, wherein the second measuring unit includes a third rotary encoder, wherein the measurement wire has a second end configured to be coupled to the third rotary encoder; and coupling the second end of the measurement wire to the third rotary encoder.

DETAILED DESCRIPTION

Figure 1:
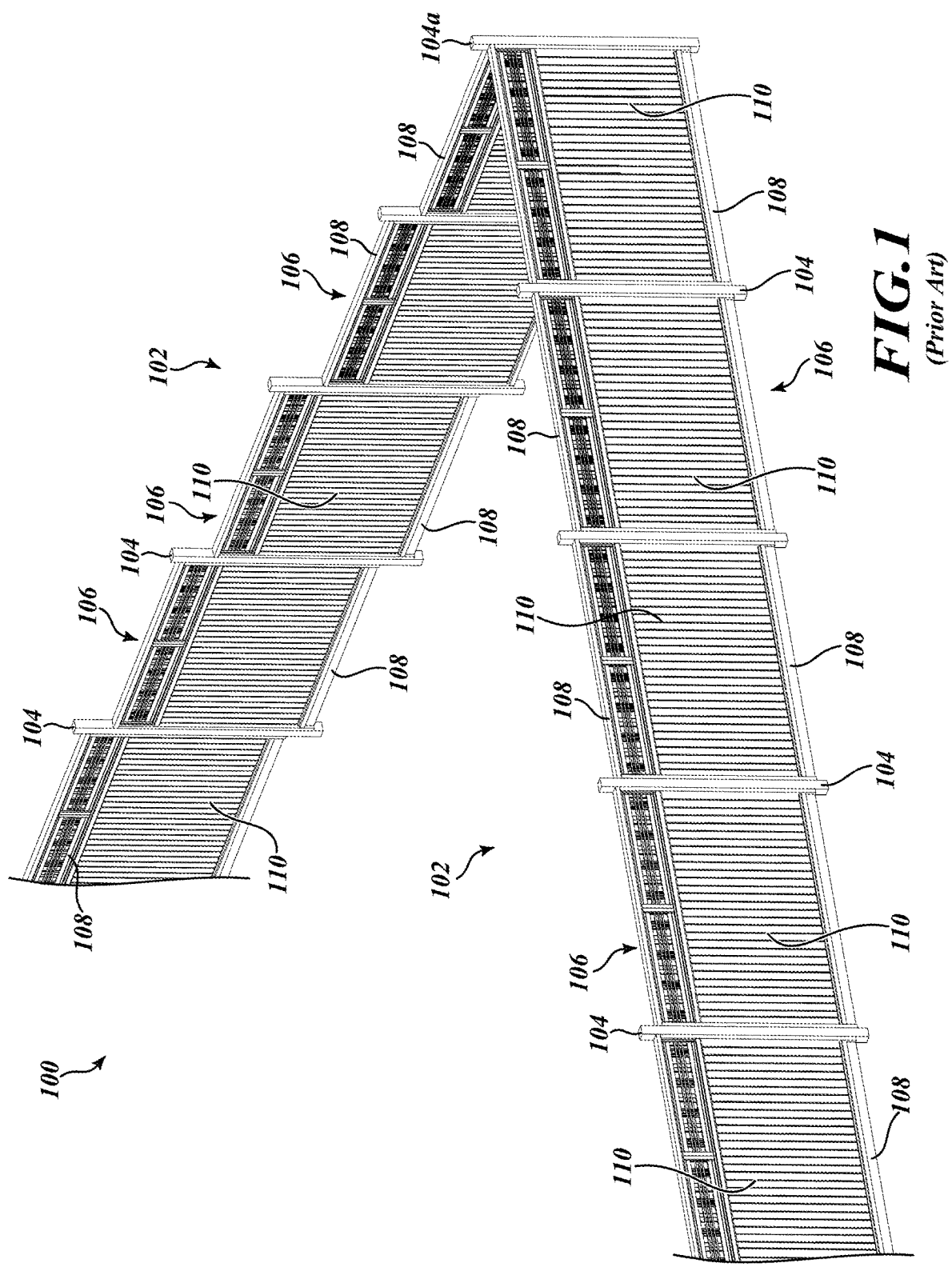
FIG. 1 shows a landscape with a fence.
Figure 2:
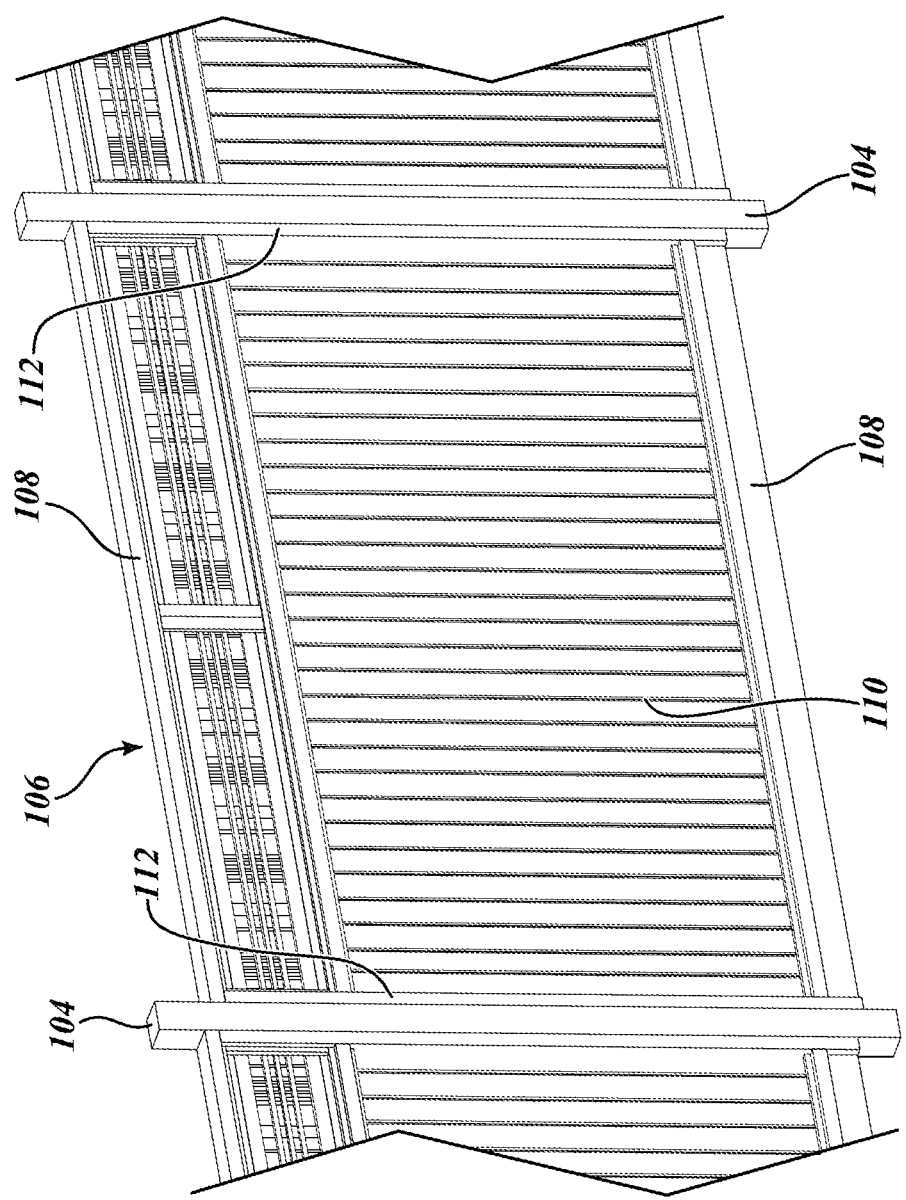
FIG. 2 shows a larger view of a portion of the landscape and fence of FIG. 1 at a larger scale.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with the technology have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The present disclosure relates generally to the installation of fences including pre-manufactured fence panels, pre-manufactured fence panel kits, and/or pre-manufactured fence panel components, and in particular to taking measurements of a set of pre-installed fence posts to which the pre-manufactured fence panels, kits, and/or components will be mounted, to enable software-driven design, production, and fulfillment of such pre-manufactured items. Currently, pre-manufactured fence panels are typically fabricated in a relatively small number of predetermined sizes, such as six feet tall by eight feet long. Such an approach typically requires that the fence posts to which the panels will be mounted be installed relatively precisely, to avoid trimming or shimming fence panels of specific, predetermined sizes when they are mounted to and installed on the fence posts.

The systems and methods described herein facilitate an alternative paradigm, in which fence posts or other posts (e.g., posts for handrails or guardrails) are installed at locations dictated, affected, determined, or influenced by, or based on, environmental parameters at the location of the fence and each of the fence posts. In particular, in accordance with the present disclosure, a set of fence posts may be installed along a fence line based on the environment, such as the terrain and soil quality along the fence line, while being mindful not to exceed a threshold or typical maximum distance between neighboring fence posts. The systems described herein may then be used to measure the positions, dimensions, and orientations of the fence posts with respect to one another. Such measurements may then be used to facilitate the fabrication of fence panels, fence panel kits, and/or fence panel components that are custom-built to fit between the fence posts as they are actually installed along the fence line. In addition, such measurements can be used, such as by a software system, to direct an installer in trimming the tops of installed posts, such as by providing directions regarding how far down from the top of the installed posts they are to be trimmed, and to direct an installer in marking the fence posts for the locations of connections to other fence components, such as fence rails, such as based on a software-generated design of the fence panels or other components.

Figure 3:
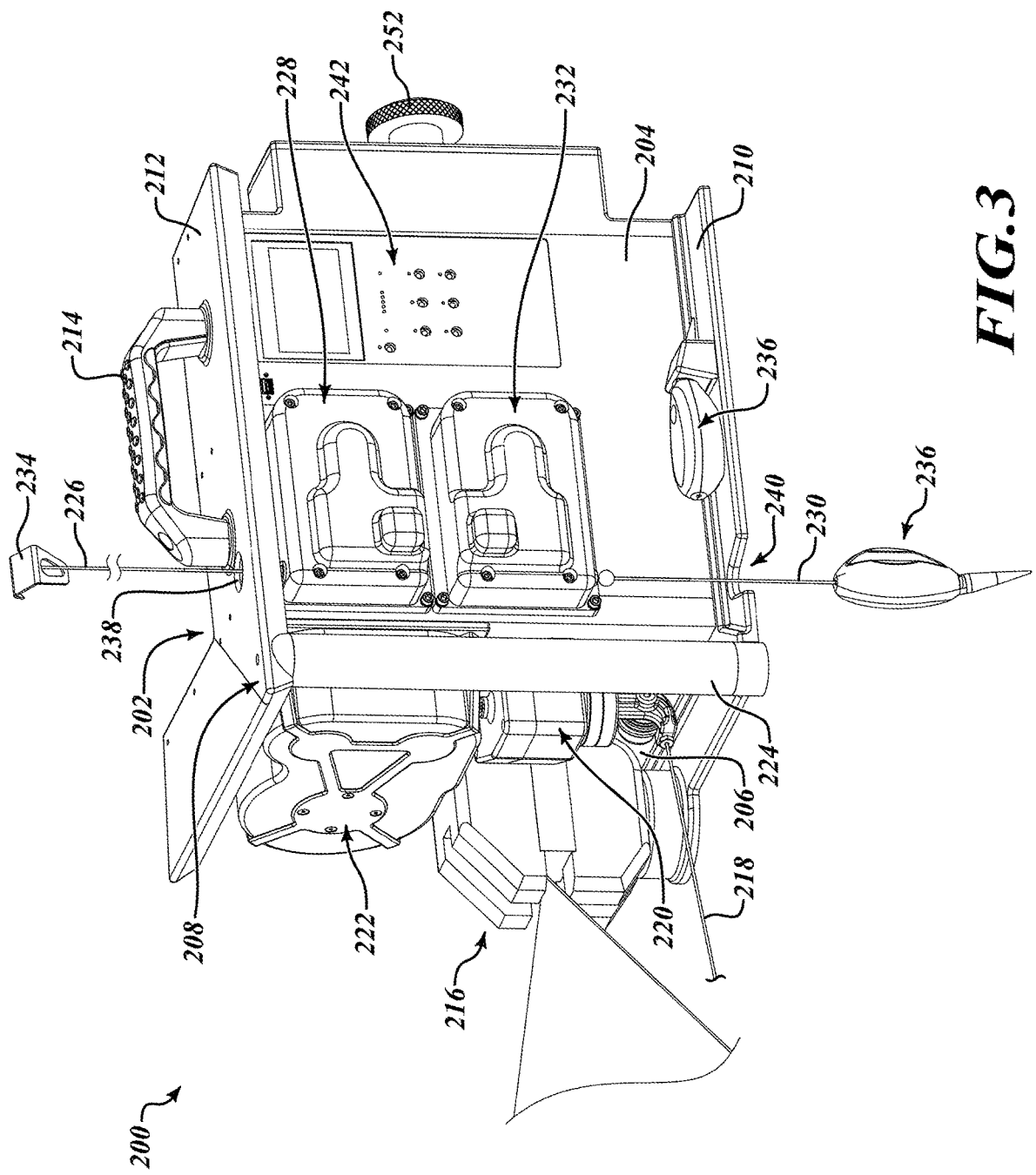
FIG. 3 shows a perspective view of a leading unit of a measurement system.

FIG. 3 illustrates one perspective view of a first portion of a measuring system, which may be referred to herein as a first measuring device, a leading measuring device, or a leading unit 200. As illustrated in FIG. 3, the leading unit 200 includes a bottom or base plate 210 that extends across a bottom end thereof, and a cap or top plate 212 that extends across a top end thereof opposite to the bottom end. As used herein with respect to the leading unit 200, terms of relative elevation or orientation, such as "top," "bottom," "above," "below," "lower," "higher," etc. carry their ordinary meaning with respect to a direction of a force of gravity when the leading unit 200 is mounted to a fence post in its customary orientation to take measurements of the fence post. That is, when the leading unit 200 is mounted to a fence post to take measurements of the fence post, the base plate 210 is at the bottom of the leading unit 200 and below and lower than the top plate 212 with respect to a direction of gravity, and the top plate 212 is at the top of the leading unit 200 and above and higher than the base plate 210 with respect to the direction of gravity.

As illustrated in FIG. 3, the leading unit 200 includes a main body 202 that is generally L-shaped when seen from above or in a plan view. In particular, the main body 202 of the leading unit 200 includes a first leg or a first arm 204, and a second leg or a second arm 206, as well as a corner 208 where the first arm 204 meets the second arm 206 at a right angle. Thus, the main body 202 has a first outer surface or outer face that extends along an outer side of the first arm 204 with respect to the corner 208, a first inner surface or inner face that extends along an inner side of the first arm 204 with respect to the corner 208, a second outer surface or outer face that extends along an outer side of the second arm 206 with respect to the corner 208, and a second inner surface or inner face that extends along an inner side of the second arm 206 with respect to the corner 208. The first outer face and the first inner face of the main body 202 each extend vertically (or parallel to a length of a fence post to which the leading unit 200 is coupled), generally perpendicular to the second arm 206 of the main body 202, and generally parallel to each other. Similarly, the second outer face and the second inner face of the main body 202 each extend vertically (or parallel to a length of a fence post to which the leading unit 200 is coupled), generally perpendicular to the first arm 204 of the main body 202, and generally parallel to each other.

As also illustrated in FIG. 3, the leading unit 200 includes a first handle 214 coupled to a top or upper surface of the top plate 212, where the first handle 214 is configured to be grasped by a single human hand to allow an operator to conveniently carry the leading unit 200. The leading unit 200 also includes a laser level unit 216, which may be an off-the-shelf, commercially available laser level, and which may be either a manual-levelling or a self-levelling laser level. The laser level unit 216 is coupled to the base plate 210 at a location facing and adjacent to, but spaced apart from, the second outer face of the main body 202. As illustrated in FIG. 3, the laser level unit 216 can be operated to emit a laser beam along an axis that moves back and forth, or oscillates, through a spread angle to generate a level horizontal line that extends outward from the laser level unit 216 and that grows in length as it moves outward from the laser level unit 216.

The leading unit 200 also includes a first measurement wire 218, which may be a 1/16" stainless steel braided wire, that extends outward away from the leading unit 200 to allow an operator to take measurements of fence posts. As illustrated in FIG. 3, the leading unit 200 also includes a first absolute or incremental rotary encoder 220 and a second absolute or incremental rotary encoder 222 each coupled to the second outer face and the second arm 206 of the main body 202. As used herein, the term "encoder" takes its ordinary meaning, and includes the operative components of an encoder as well as supporting and housing components thereof. The first measurement wire 218 extends through the first rotary encoder 220 and into the second rotary encoder 222, and terminates at a proximal end thereof (e.g., winds up into a spring-loaded mechanism) inside or within the second rotary encoder 222. The first rotary encoder 220, through which the first measurement wire 218 extends, is configured to measure, and output data representative of, an angle about a vertical axis (or an axis parallel to a length of a fence post to which the leading unit 200 is coupled) at which the first measurement wire 218 extends with respect to the second outer face and the second arm 206 of the main body 202. The second rotary encoder 222, into which the first measurement wire 218 extends and within which the first measurement wire 218 terminates, is configured to measure, and output data representative of, a length of the first measurement wire 218, such as with respect to the second rotary encoder 222, or the second outer face and the second arm 206 of the main body 202.

The leading unit 200 also includes a second handle 224 that extends up-and-down, vertically, or parallel to a length of a fence post to which the leading unit 200 is coupled, from the base plate 210 to the top plate 212, where the second handle 224 is configured to be grasped by a single human hand to allow an operator to conveniently carry the leading unit 200. As illustrated in FIG. 3, the leading unit 200 also includes a second measurement wire 226, which may be a 1/16" stainless steel braided wire, that extends upward away from the leading unit 200 to allow an operator to take measurements of fence posts. As illustrated in FIG. 3, the leading unit 200 also includes a third absolute or incremental rotary encoder 228 coupled to the first outer face and the first arm 204 of the main body 202 at a location between the base plate 210 and the top plate 212. The second measurement wire 226 extends through an opening 238 or a notch 238 in the top plate 212, into the third rotary encoder 228, and terminates at a proximal end thereof inside or within the third rotary encoder 228. The third rotary encoder 228 is configured to measure, and output data representative of, a length of the second measurement wire 226, such as with respect to the third rotary encoder 228, or a top or upper surface of the top plate 212.

As further illustrated in FIG. 3, the leading unit 200 also includes a third measurement wire 230, which may be a 1/16" stainless steel braided wire, that extends downward away from the leading unit 200 to allow an operator to take measurements of fence posts. As illustrated in FIG. 3, the leading unit 200 also includes a fourth absolute or incremental rotary encoder 232 coupled to the first outer face and the first arm 204 of the main body 202 at a location between the base plate 210 and the top plate 212 and below the third rotary encoder 228. The third measurement wire 230 extends through an opening 240 or a notch 240 in the base plate 210, into the fourth rotary encoder 232, and terminates at a proximal end thereof inside or within the fourth rotary encoder 232. The fourth rotary encoder 232 is configured to measure, and output data representative of, a length of the third measurement wire 230, such as with respect to the fourth rotary encoder 232, or a bottom or lower surface of the base plate 210.

Together, the second measurement wire 226, the third rotary encoder 228, the third measurement wire 230, and the fourth rotary encoder 232 facilitate measurements of a length or a height of a fence post to which the leading unit 200 is coupled. For example, the leading unit 200 includes a hook 234 coupled to a distal, terminal end of the second measurement wire 226 and a controller 236 coupled to a distal, terminal end of the third measurement wire 230. As described in greater detail elsewhere herein, in use, an operator can position a portion of the hook 234 at or on the top of the fence post and the controller 236 at or proximate the bottom of the fence post, and the data output by the third rotary encoder 228 and the fourth rotary encoder 232 can be used to determine a length and/or a height of the fence post. When the controller 236 is not in use, it can be positioned and stored on a top or upper surface of the base plate 210, as also illustrated in FIG. 3.

The leading unit 200 also includes an onboard computing device and controller, which may be referred to herein as computer 242, which can control operation of the various components of the leading unit 200 and collect data and measurements provided by the various components of the leading unit 200. The computer 242 may also include one or more communications subsystems that allows the computer 242 to communicate with other electronic devices and computers, such as by wired connection(s), such as over USB, Ethernet, or other data transmission cables, and/or by wireless connection(s), such as over a Bluetooth, WiFi, or other wireless transmission protocol.

Figure 4:
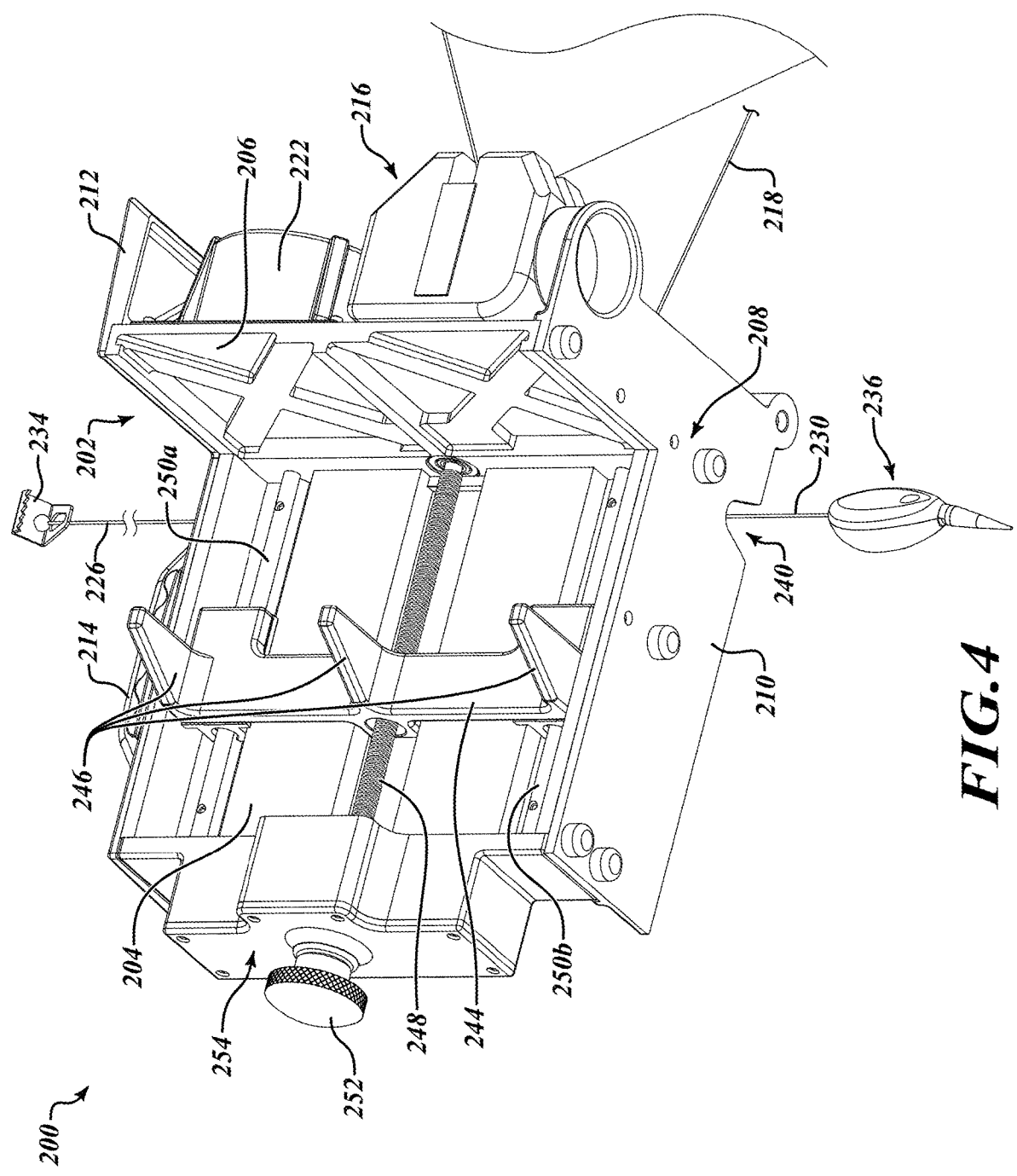
FIG. 4 shows a different perspective view of the leading unit of FIG. 3.

FIG. 4 illustrates another perspective view of the leading unit 200, with the first inner surface or inner face and the second inner surface or inner face visible. As illustrated in FIG. 4, the leading unit 200 includes a clamp or a vise that allows the leading unit 200 to be clamped, coupled, or mounted to a fence post. For example, the main body 202, including the first arm 204 and the second arm 206, forms a stationary or fixed body of the vise, and the second arm 206 forms a stationary jaw of the vise. The leading unit 200 also includes a slide 244 that is integrally formed with exactly three sliding jaws 246, although in alternative implementations, the slide 244 may be formed with exactly one sliding jaw 246, exactly two sliding jaws 246, or four or more sliding jaws 246. The slide 244 is coupled to the first arm 204 of the main body 202 by a first, upper or top guide rod 250a located adjacent or proximate to the top plate 212, a second, lower or bottom guide rod 250b located adjacent or proximate to the base plate 210 and below the top guide rod 250a, and a threaded rod or screw 248 located approximately halfway between the base plate 210 and the top plate 212 and halfway between the top guide rod 250a and the bottom guide rod 250b.

As illustrated in FIG. 4, the top and bottom guide rods 250a and 250b are rigidly coupled to the first arm 204 of the main body 202 of the leading unit 200, and extend generally horizontally, or parallel to the first arm 204 and the first inner and outer surfaces thereof, and perpendicular to the second arm 206 and the second inner and outer surfaces thereof. As further illustrated in FIG. 4, the screw 248 is coupled to the first arm 204 of the main body 202 of the leading unit 200 such that it cannot translate but can rotate about its own central longitudinal axis with respect to the first arm 204 of the main body 202 of the leading unit 200, and extends generally horizontally, or parallel to the first arm 204 and the first inner and outer surfaces thereof, and perpendicular to the second arm 206 and the second inner and outer surfaces thereof.

The leading unit 200 further includes a handle 252 that is rigidly coupled to the screw 248 such that a human operator can rotate or turn the handle 252 to drive the screw 248 to rotate about its own central longitudinal axis with respect to the rest of the leading unit 200. For example, the operator can turn the handle 252 in a first direction to drive the screw 248 to rotate in a first direction, and can turn the handle 252 in a second direction opposite the first to drive the screw 248 to rotate in a second direction opposite the first. The slide 244 is slidably mounted on and engaged with the top and bottom guide rods 250a, 250b, such that the slide 244 is constrained to translate linearly along the length of the top and bottom guide rods 250a and 250b.

The slide 244 is threadedly engaged with the screw 248 such that, due to its engagement with the guide rods 250, the slide 244 is constrained to translate linearly along the length of the screw 248 as the screw 248 rotates about its own central longitudinal axis. The sliding jaws 246 each include a planar surface that faces toward the second arm 206 (which planar surfaces may in various implementations be larger or smaller than those illustrated herein), which may form pads or pinch points such that a fence post can be gripped between the sliding jaws 246 and the second arm 206. For example, an operator can turn the handle 252 in a first direction to drive the slide 244 and its sliding jaws 246 to move toward the second arm 206 to engage and grip a fence post between the sliding jaws 246 and the second arm 206, and can turn the handle 252 in a second direction opposite the first to drive the slide 244 and its sliding jaws 246 to move away from the second arm 206 to release the fence post between the sliding jaws 246 and the second arm 206. The leading unit 200 further includes a housing 254 that encloses an absolute or incremental encoder that measures, and outputs data representative of, a location of the slide 244 with respect to the second arm 206, or a distance between surfaces of the slide 244 facing the second arm 206 and surfaces of the second arm 206 facing the slide 244. Such measurements or outputted data can be used to measure dimensions of a fence post to which the leading unit 200 is coupled, such as a thickness or width thereof.

Figure 5:
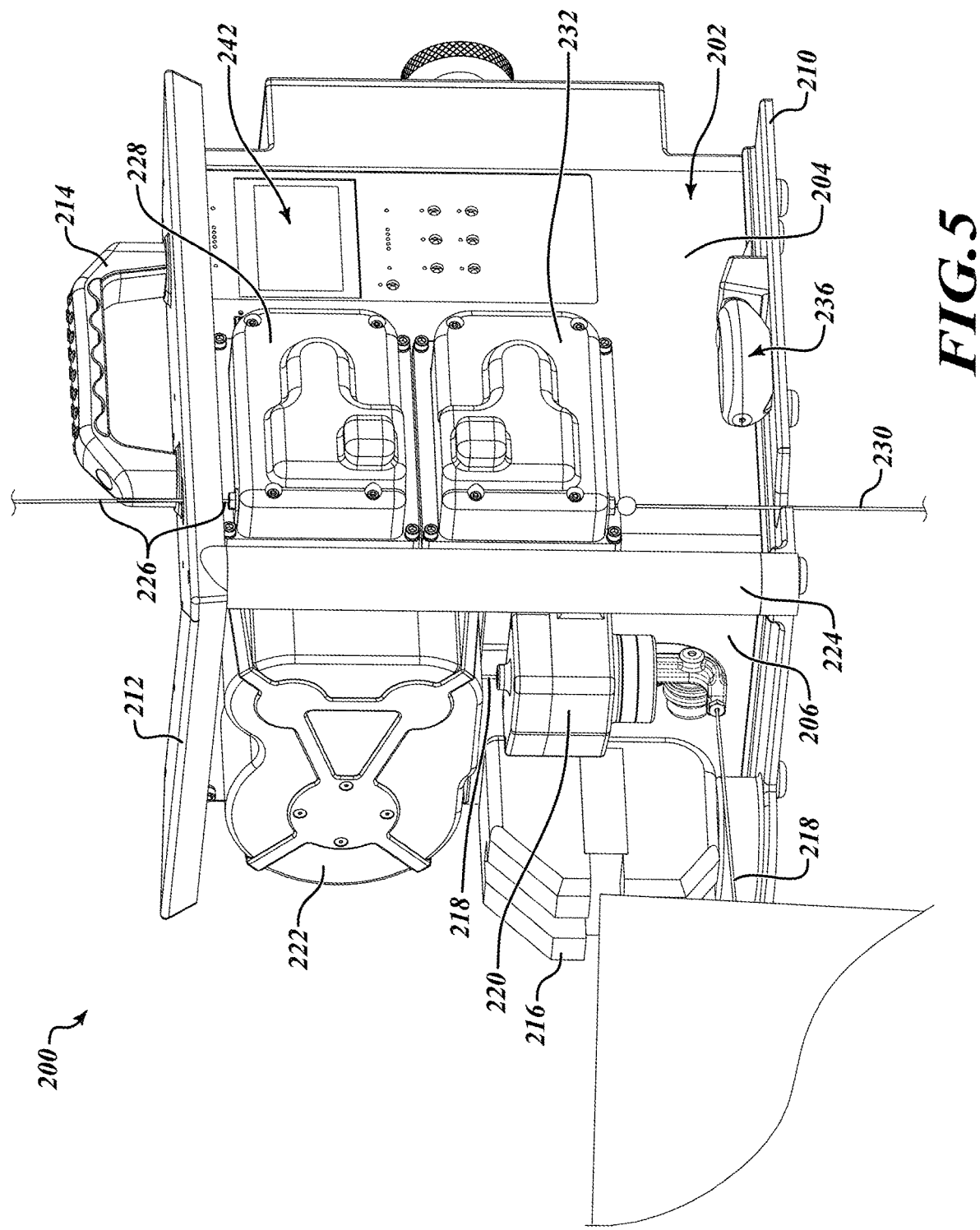
FIG. 5 shows a different perspective view of a portion of the leading unit of FIGS. 3 and 4.

FIG. 5 illustrates a view of a portion of the leading unit 200, with additional portions of the leading unit 200 visible.

Figure 7:
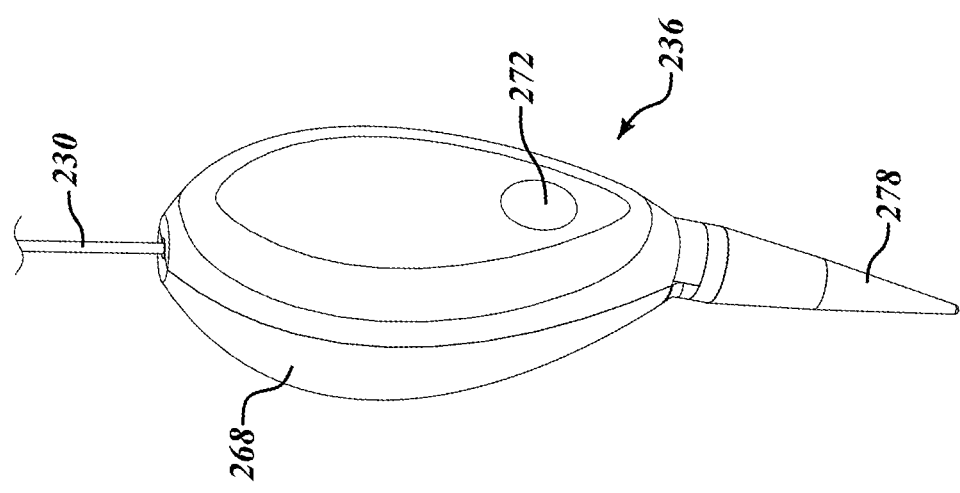
FIG. 7 shows a different perspective view of the controller of FIG. 6.
Figure 6:
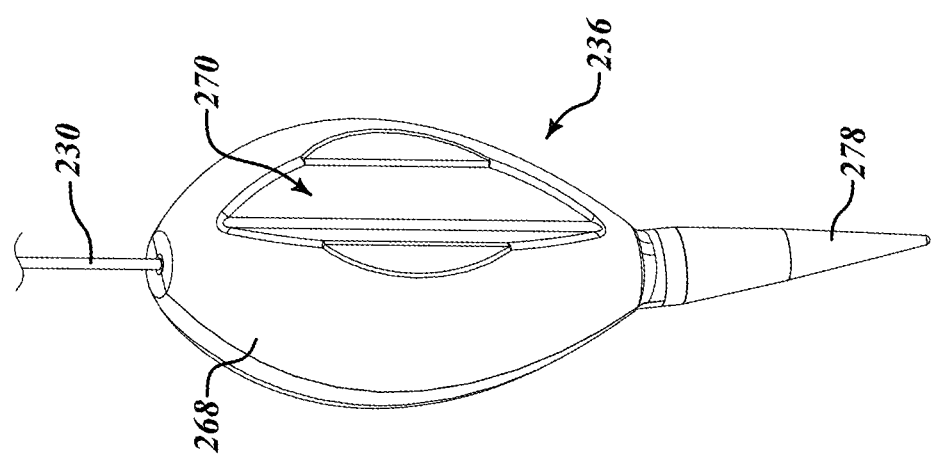
FIG. 6 shows a perspective view of a controller for the leading unit of FIGS. 3-5.

FIG. 6 illustrates a first perspective view of a distal, terminal end portion of the third measurement wire 230 and the controller 236, and FIG. 7 illustrates a second perspective view of the distal, terminal end portion of the third measurement wire 230 and the controller 236. As illustrated in FIGS. 6 and 7, the controller 236 has a smoothly contoured main body 268, such that it can be comfortably held in a human operator's hand. A first side of the main body 268, illustrated in FIG. 6, includes a vertically-extending or generally vertically-extending groove 270 that has a first sidewall and a second sidewall that meets the first sidewall at a ninety-degree angle at a base or bottom of the groove 270. In use, the controller may be situated with a corner of a fence post to which the leading unit 200 is coupled seated within the groove 270, such that a "reference" corner of the fence post is engaged with the bottom of the groove and two adjacent sides of the fence post are engaged with the two sidewalls of the groove 270. Such a "reference" corner may be a corner of the fence post with respect to which all measurements are taken, in the methods described herein.

Figure 8:
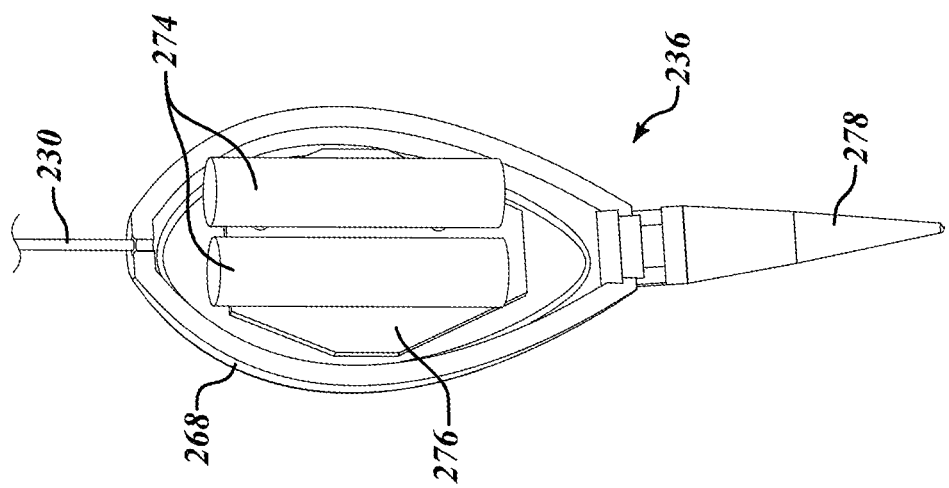
FIG. 8 shows another perspective view of the controller of FIG. 6 with a part of a housing thereof removed to reveal internal components.

A second side of the main body 268, illustrated in FIG. 7, includes a button 272 that can be pressed by an operator to initiate a "data capture" routine of the leading unit 200, which may be controlled by the computer 242, as described in greater detail elsewhere herein. FIG. 8 illustrates another perspective view of the distal, terminal end portion of the third measurement wire 230 and the controller 236, with a portion of a housing of the main body 268 removed to reveal other, internal components thereof. In particular, FIG. 8 illustrates that the controller 236 includes a pair of batteries 274, which may be lithium-ion batteries, button-style batteries, or other batteries known in the art, which may be twelve-volt batteries, and which may in alternative implementations be replaced by a single battery or three or more batteries, and a printed circuit board 276, which has various electronic components coupled thereto, including the button 272 and communications devices, such as wired communications devices, such as USB, Ethernet, or other data transmission cables or devices, or wireless communications devices, such as Bluetooth, WiFi, or other wireless transmission devices.

As further illustrated in FIGS. 6-8, the controller 236 also includes a conical body 278 that extends downward out of and away from a bottom end of the main body 268, such that the diameter of the conical body 278 tapers and decreases as it extends downward away from the main body 268, and such that the bottom-most end of the controller 236 terminates at a pointed tip of the conical body 278. In use, the controller 236 may be situated with the terminal, distal, pointed tip of the conical body 278 at an elevation or a height corresponding to a lowest desired elevation of any fence panel components to be coupled to the fence post to which the leading unit 200 is coupled (e.g., fence rails or fence boards via fence rails), which may be 2-3 inches above the ground surface.

Figure 9:
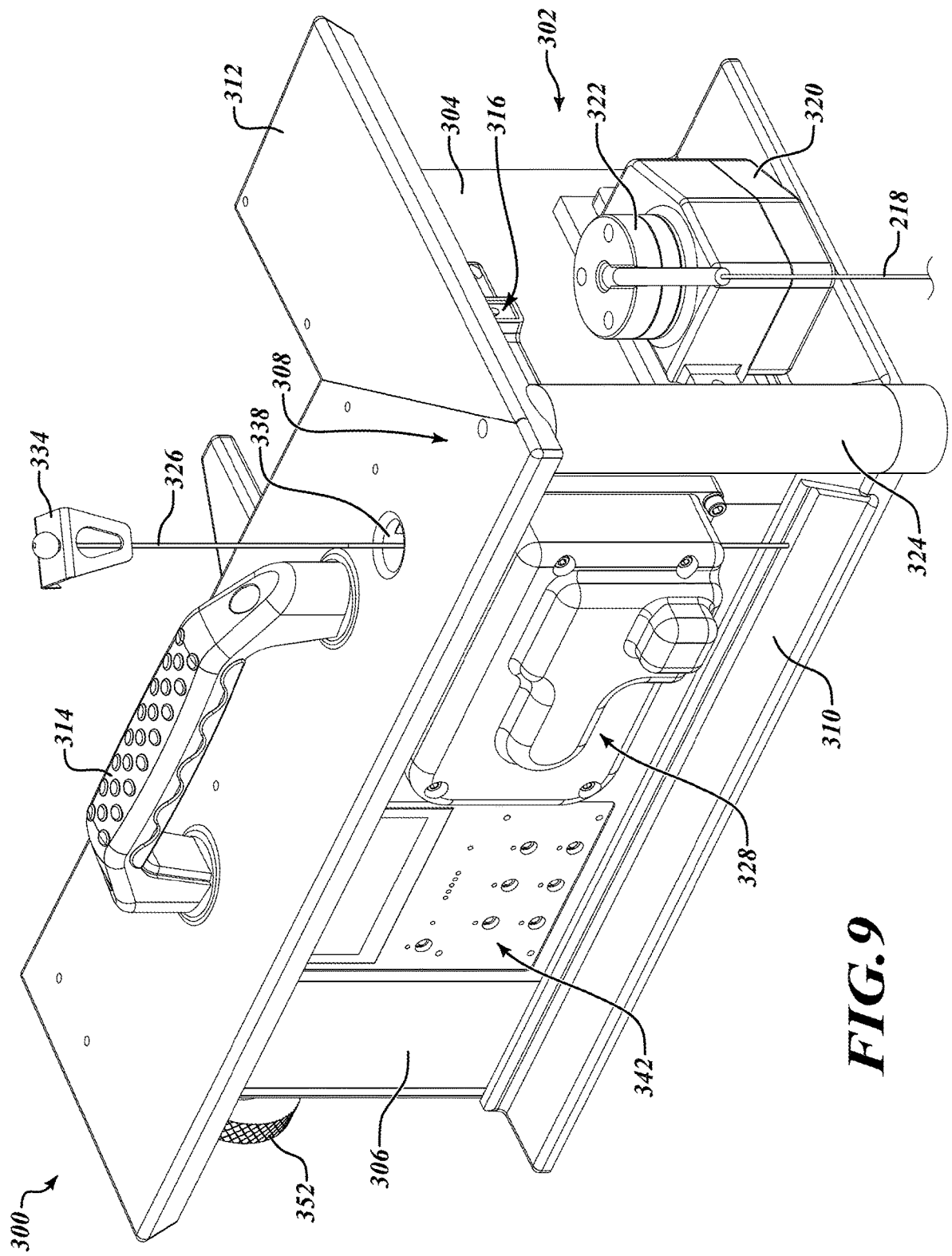
FIG. 9 shows a perspective view of a trailing unit of a measurement system.

FIG. 9 illustrates one perspective view of a second portion of the measuring system, which may be referred to herein as a second measuring device, a following measuring device, a trailing measuring device, a following unit, or a trailing unit 300. As illustrated in FIG. 9, the trailing unit 300 includes a bottom or base plate 310 that extends across a bottom end thereof, and a cap or top plate 312 that extends across a top end thereof opposite to the bottom end. As used herein with respect to the trailing unit 300, terms of relative elevation or orientation, such as "top," "bottom," "above," "below," "lower," "higher," etc. carry their ordinary meaning with respect to a direction of a force of gravity when the trailing unit 300 is mounted to a fence post in its customary orientation to take measurements of the fence post. That is, when the trailing unit 300 is mounted to a fence post to take measurements of the fence post, the base plate 310 is at the bottom of the trailing unit 300 and below and lower than the top plate 312 with respect to a direction of gravity, and the top plate 312 is at the top of the trailing unit 300 and above and higher than the base plate 310 with respect to the direction of gravity.

As illustrated in FIG. 9, the trailing unit 300 includes a main body 302 that is generally L-shaped when seen from above or in a plan view. In particular, the main body 302 of the trailing unit 300 includes a first leg or a first arm 304, and a second leg or a second arm 306, as well as a corner 308 where the first arm 304 meets the second arm 306 at a right angle. Thus, the main body 302 has a first outer surface or outer face that extends along an outer side of the first arm 304 with respect to the corner 308, a first inner surface or inner face that extends along an inner side of the first arm 304 with respect to the corner 308, a second outer surface or outer face that extends along an outer side of the second arm 306 with respect to the corner 308, and a second inner surface or inner face that extends along an inner side of the second arm 306 with respect to the corner 308. The first outer face and the first inner face of the main body 302 each extend vertically (or parallel to a length of a fence post to which the trailing unit 300 is coupled), generally perpendicular to the second arm 306 of the main body 302, and generally parallel to each other. Similarly, the second outer face and the second inner face of the main body 302 each extend vertically (or parallel to a length of a fence post to which the trailing unit 300 is coupled), generally perpendicular to the first arm 304 of the main body 302, and generally parallel to each other.

As also illustrated in FIG. 9, the trailing unit 300 includes a first handle 314 coupled to a top or upper surface of the top plate 312, where the first handle 314 is configured to be grasped by a single human hand to allow an operator to conveniently carry the trailing unit 300. The trailing unit 300 also includes a photodiode unit 316. The photodiode unit 316 is coupled to the first outer face of the first arm 304 of the main body 300 such that a plurality of photodiodes thereof face outward from the trailing unit 300. The trailing unit 300 also includes a first absolute or incremental rotary encoder 320 coupled to the first outer face of the first arm 304 of the main body 302 and separated or spaced apart from a top, upper surface of the base plate 310, and a rotatable body 322 rotatably coupled to the first rotary encoder 320, such that the first rotary encoder 320 can measure, and output data representative of, rotation of the rotatable body 322 with respect to the first rotary encoder 320. As also illustrated in FIG. 9, a distal, terminal end of the first measurement wire 218 may extend to and be coupled to the trailing unit 300, such as within a groove in a top, upper surface of the rotatable body 322. In some implementations, by way of example, the terminal end of the first measurement wire 218 may be coupled to the rotatable body 322 of the trailing unit 300 by mechanical devices including detents and/or movable lever arms.

The trailing unit 300 also includes a second handle 324 that extends up-and-down, vertically, or parallel to a length of a fence post to which the trailing unit 300 is coupled, from the base plate 310 to the top plate 312, where the second handle 324 is configured to be grasped by a single human hand to allow an operator to conveniently carry the trailing unit 300. As illustrated in FIG. 9, the trailing unit 300 also includes a measurement wire 326, which may be a 1/16" stainless steel braided wire, that extends upward away from the trailing unit 300 to allow an operator to take measurements of fence posts. As illustrated in FIG. 9, the trailing unit 300 also includes a second absolute or incremental rotary encoder 328 coupled to the second outer face and the second arm 306 of the main body 302 at a location between the base plate 310 and the top plate 312. The measurement wire 326 extends through an opening 338 or a notch 338 in the top plate 312, into the second rotary encoder 328, and terminates at a proximal end thereof inside or within the second rotary encoder 328.

The second rotary encoder 328 is configured to measure, and output data representative of, a length of the measurement wire 326, such as with respect to the second rotary encoder 328, or a top or upper surface of the top plate 312. The trailing unit 300 includes a hook 334 coupled to a distal, terminal end of the measurement wire 326. As described in greater detail elsewhere herein, in use, an operator can position a portion (e.g., a tooth portion) of the hook 334 at or on the top of the fence post, and the data output by the second rotary encoder 328 can be used to measure a distance from the trailing unit 300 to a top, upper end of a fence post to which it is coupled.

The trailing unit 300 also includes an onboard computing device and controller, which may be referred to herein as computer 342, which can control operation of the various components of the trailing unit 300 and collect data and measurements provided by the various components of the trailing unit 300, as well as make computations with that data. The computer 342 may also include one or more communications subsystems that allows the computer 342 to communicate with other electronic devices and computers, such as the computer 242 of the leading unit 200, such as by wired connections, such as over USB, Ethernet, or other data transmission cables, or by wireless connections, such as over a Bluetooth, WiFi, or other wireless transmission protocol.

Figure 10:
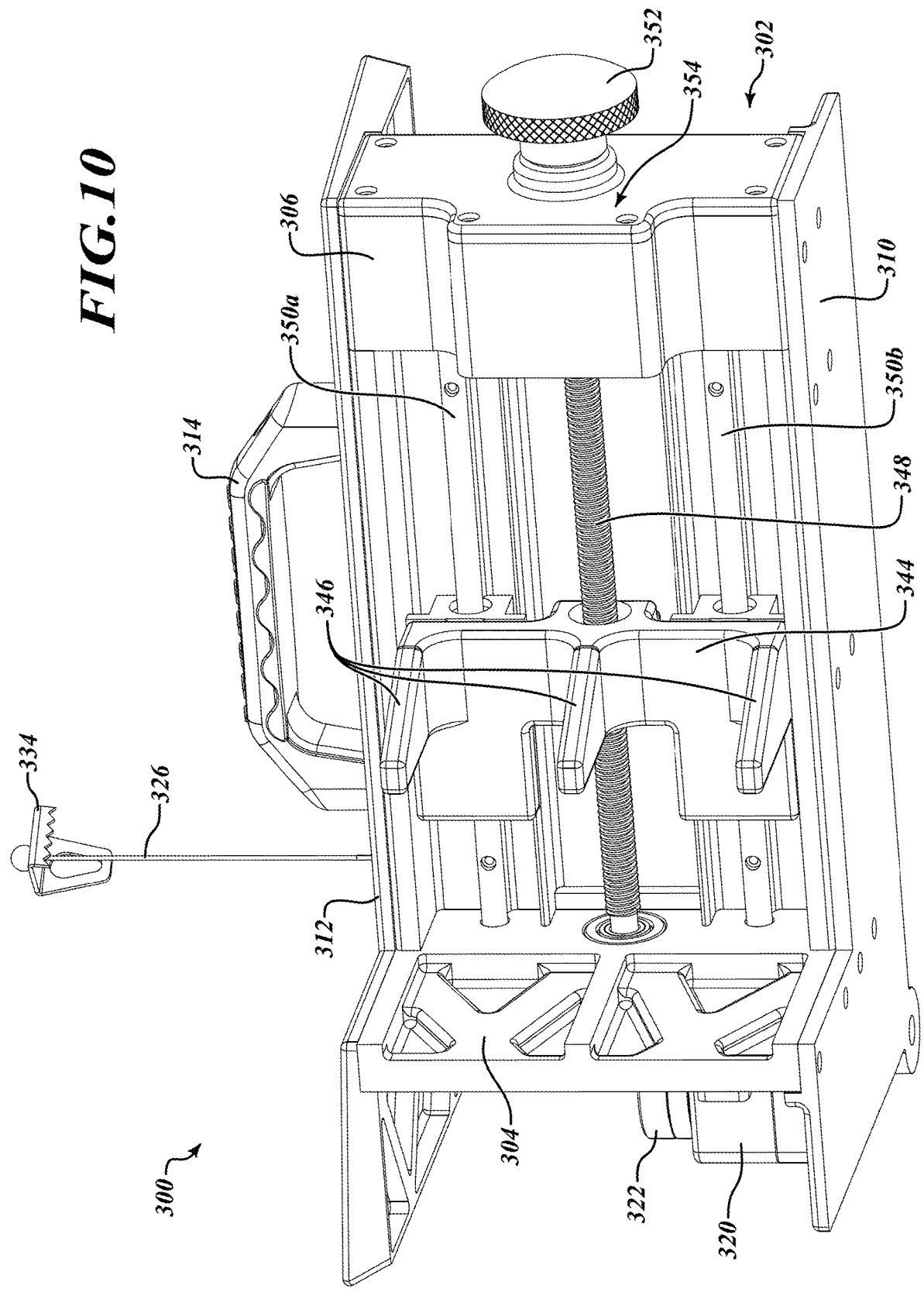
FIG. 10 shows a different perspective view of the trailing unit of FIG. 9.

FIG. 10 illustrates another perspective view of the trailing unit 300, with the first inner surface or inner face and the second inner surface or inner face visible. As illustrated in FIG. 10, the trailing unit 300 includes a clamp or a vise that allows the trailing unit 300 to be clamped, coupled, or mounted to a fence post. For example, the main body 302, including the first arm 304 and the second arm 306, forms a stationary or fixed body of the vise, and the first arm 304 forms a stationary jaw of the vise. The trailing unit 300 also includes a slide 344 that is integrally formed with exactly three sliding jaws 346, although in alternative implementations, the slide 344 may be formed with exactly one sliding jaw 346, exactly two sliding jaws 346, or four or more sliding jaws 346. The slide 344 is coupled to the second arm 306 of the main body 302 by a first, upper or top guide rod 350a located adjacent or proximate to the top plate 312, a second, lower or bottom guide rod 350b located adjacent or proximate to the base plate 310 and below the top guide rod 350a, and a threaded rod or screw 348 located approximately halfway between the base plate 310 and the top plate 312 and halfway between the top guide rod 350a and the bottom guide rod 350b.

As illustrated in FIG. 10, the top and bottom guide rods 350a and 350b are rigidly coupled to the second arm 306 of the main body 302 of the trailing unit 300, and extend generally horizontally, or parallel to the second arm 306 and the second inner and outer surfaces thereof, and perpendicular to the first arm 304 and the first inner and outer surfaces thereof. As further illustrated in FIG. 10, the screw 348 is coupled to the second arm 306 of the main body 302 of the trailing unit 300 such that it cannot translate but can rotate about its own central longitudinal axis with respect to the second arm 306 of the main body 302 of the trailing unit 300, and extends generally horizontally, or parallel to the second arm 306 and the second inner and outer surfaces thereof, and perpendicular to the first arm 304 and the first inner and outer surfaces thereof.

The trailing unit 300 further includes a handle 352 that is rigidly coupled to the screw 348 such that a human operator can rotate or turn the handle 352 to drive the screw 348 to rotate about its own central longitudinal axis with respect to the rest of the trailing unit 300. For example, the operator can turn the handle 352 in a first direction to drive the screw 348 to rotate in a first direction, and can turn the handle 352 in a second direction opposite the first to drive the screw 348 to rotate in a second direction opposite the first. The slide 344 is slidably mounted on and engaged with the top and bottom guide rods 350a, 350b, such that the slide 344 is constrained to translate linearly along the length of the top and bottom guide rods 350a and 350b.

The slide 344 is threadedly engaged with the screw 348 such that, due to its engagement with the guide rods 350, the slide 344 is constrained to translate linearly along the length of the screw 348 as the screw 348 rotates about its own central longitudinal axis. The sliding jaws 346 each include a planar surface that faces toward the first arm 304 (which planar surfaces may in various implementations be larger or smaller than those illustrated herein), which may form pads or pinch points such that a fence post can be gripped between the sliding jaws 346 and the first arm 304. For example, an operator can turn the handle 352 in a first direction to drive the slide 344 and its sliding jaws 346 to move toward the first arm 304 to engage and grip a fence post between the sliding jaws 346 and the first arm 304, and can turn the handle 352 in a second direction opposite the first to drive the slide 344 and its sliding jaws 346 to move away from the first arm 304 to release the fence post between the sliding jaws 346 and the first arm 304. In some implementations, the trailing unit 300 does not include an encoder coupled to the slide 344 to measure movement or a location of the slide 344. In other implementations, the trailing unit 300 further includes a housing 354 that encloses an absolute or rotary encoder that measures, and outputs data representative of, a location of the slide 344 with respect to the first arm 304, or a distance between surfaces of the slide 344 facing the first arm 304 and surfaces of the first arm 304 facing the slide 344. Such measurements or outputted data can be used to measure dimensions of a fence post to which the trailing unit 300 is coupled, such as a thickness or width thereof.

Figure 11:
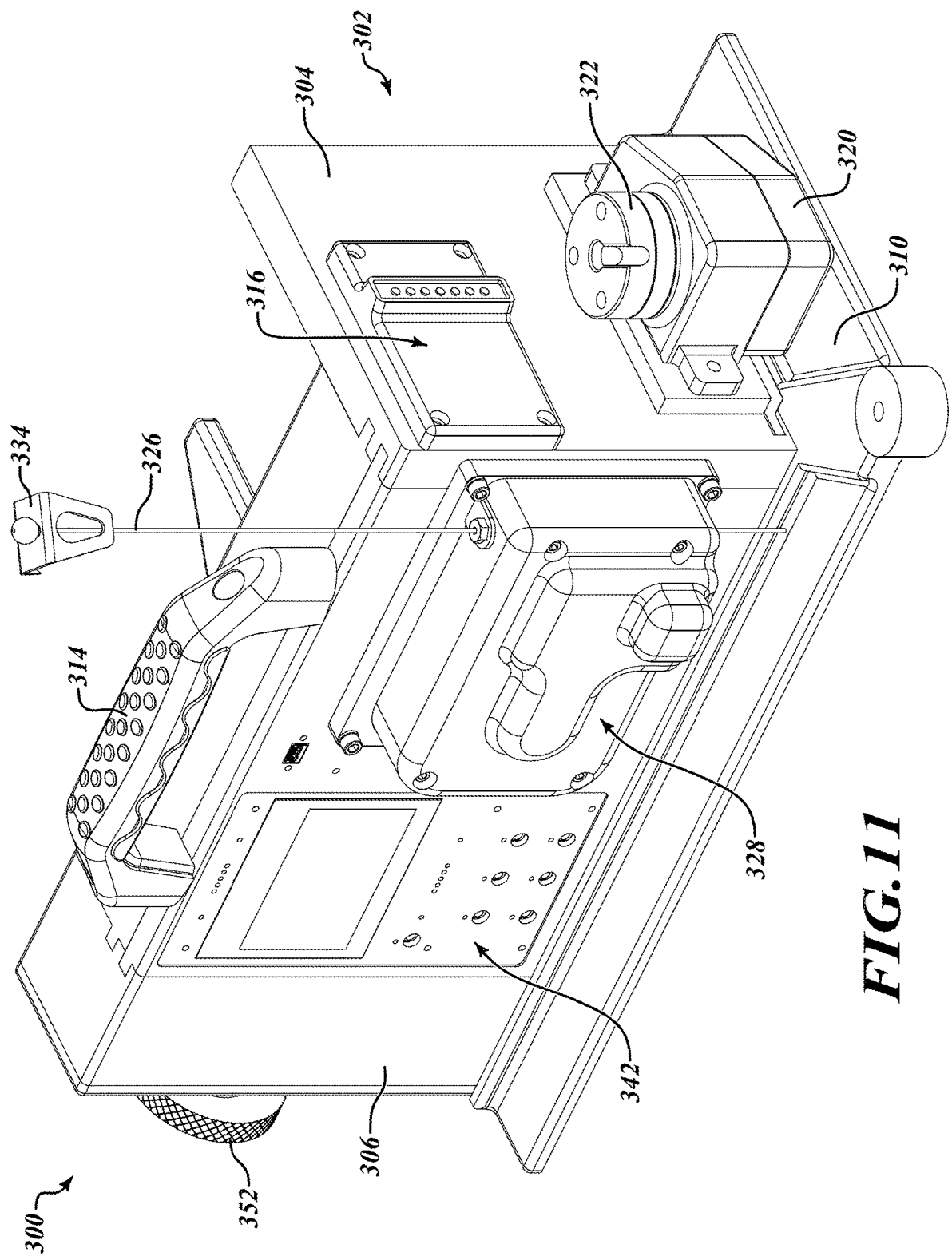
FIG. 11 shows another perspective view of the trailing unit of FIGS. 9 and 10 with components thereof removed to reveal other features.

FIG. 11 illustrates another view of the trailing unit 300 with the top plate 312, the first measurement wire 218, and the second handle 324 removed to more clearly illustrate other portions of the trailing unit 300. For example, as illustrated in FIG. 11, the photodiode unit 316 includes a plurality of photodiodes (e.g., seven photodiodes) aligned with one another in a single line that extends vertically or parallel to a length of a fence post to which the trailing unit 300 is coupled. In some implementations, the photodiodes arranged in the single line are adjacent to one another, or are minimally spaced apart from one another by distances defined by their own dimensions, such as their diameters. As another example, the photodiode unit 316 may include a plurality of photodiodes (e.g., thirteen, fourteen, or fifteen photodiodes) aligned with one another in exactly two vertical lines that extend vertically or parallel to a length of a fence post to which the trailing unit 300 is coupled. In some implementations, the photodiodes arranged in the two lines are adjacent to one another, or are minimally spaced apart from one another by distances defined by their own dimensions, such as their diameters. The elevations of the photodiodes in a first one of the lines may be staggered or offset from the elevations of the photodiodes in a second one of the lines, such as by half the center-to-center distance between the photodiodes in the second one of the lines, which may allow the photodiode unit 316 to provide greater overall accuracy. As another example, the rotatable body 322 includes a groove in a top, upper surface thereof, where the groove extends from a first end thereof at a radial edge of the top, upper surface to a second end thereof, opposite the first end, at a center point of the top, upper surface. As illustrated in FIG. 11, the second end of the groove at the center point of the top, upper surface of the rotatable body 322 has a wide diameter with respect to the rest of the groove.

Figure 12:
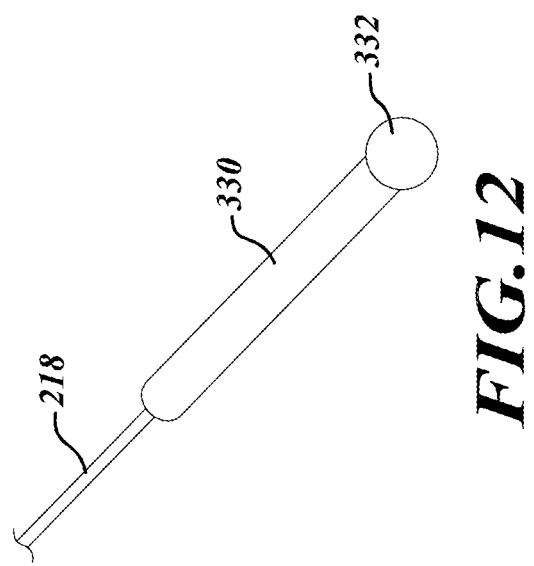
FIG. 12 shows a perspective view of a terminal end portion of a measurement wire of the leading unit of FIGS. 3-5 that is configured to be coupled to the trailing unit of FIGS. 9-11.

FIG. 12 illustrates a perspective view of a distal, terminal end portion of the first measurement wire 218 of the leading unit 200. As illustrated in FIG. 12, the distal, terminal end portion of the first measurement wire 218 is coupled to an elongate cylindrical body 330, and a distal, terminal end portion of the elongate cylindrical body 330 is coupled to another body, such as a t-shaped, triangular, or spherical body 332, that has a width or diameter greater than that of the cylindrical body 330. The cylindrical body 330 has an outside diameter that corresponds to or matches the diameter of the groove formed in the top, upper surface of the rotatable body 322, and the spherical body 332 has an outside diameter that corresponds to or matches the diameter of the enlarged terminal end portion of the groove at the center point of the top, upper surface of the rotatable body 322. Thus, in use, the cylindrical body 330 and the spherical body 332 can be seated within the groove to allow the leading unit 200 and the trailing unit 300 to take measurements of a neighboring pair of fence posts in a fence run. In some implementations, by way of example, the terminal end of the first measurement wire 218, including the cylindrical body 330 and the spherical body 332, may be coupled to the rotatable body 322 of the trailing unit 300 by mechanical devices including detents and/or movable lever arms.

Figure 13:
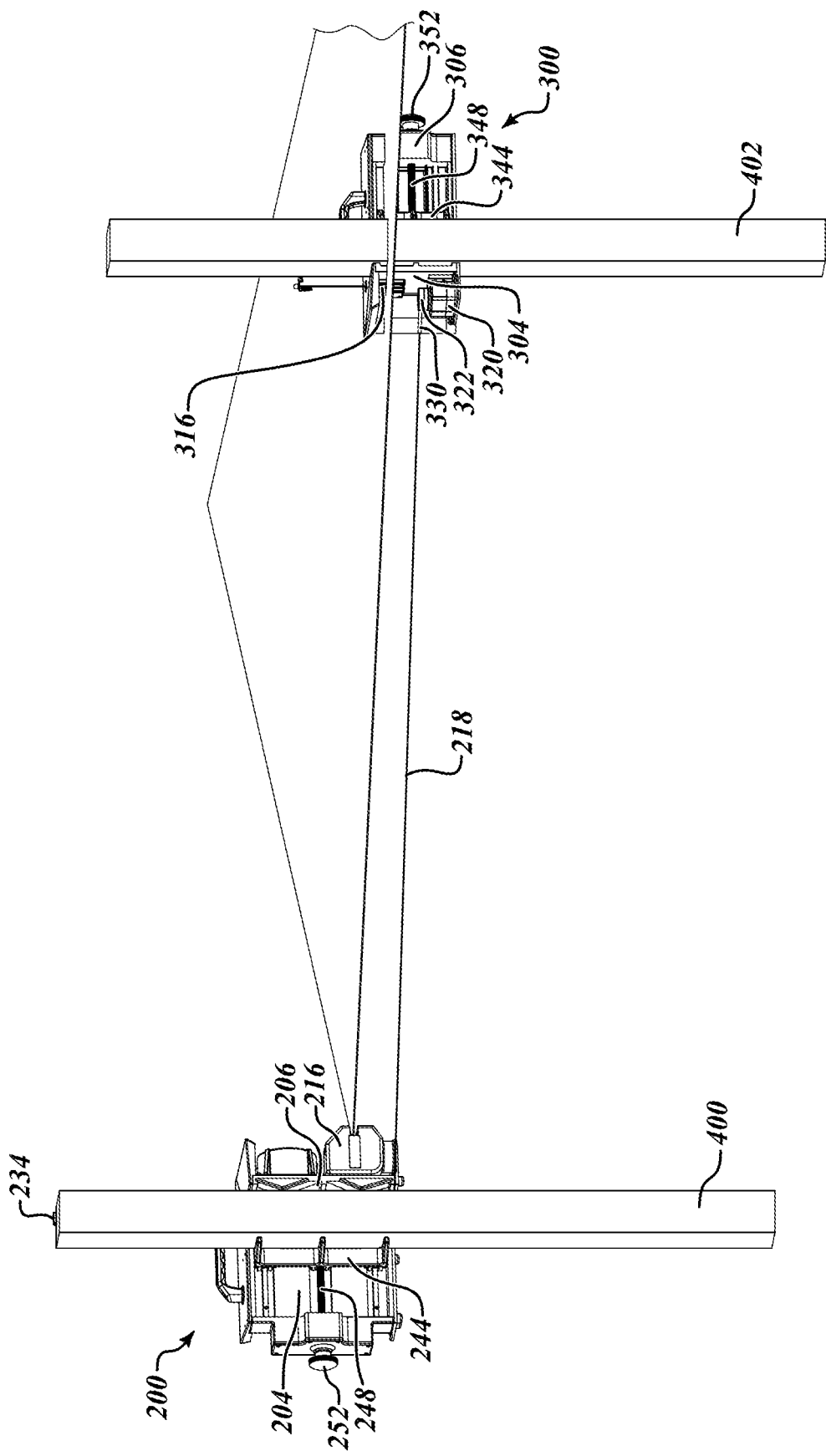
FIG. 13 shows a perspective view of the leading unit of FIGS. 3-5 coupled to a second fence post, the trailing unit of FIGS. 9-11 coupled to a first fence post, and the terminal end portion of the measurement wire of the leading unit coupled to the trailing unit.
Figure 14:
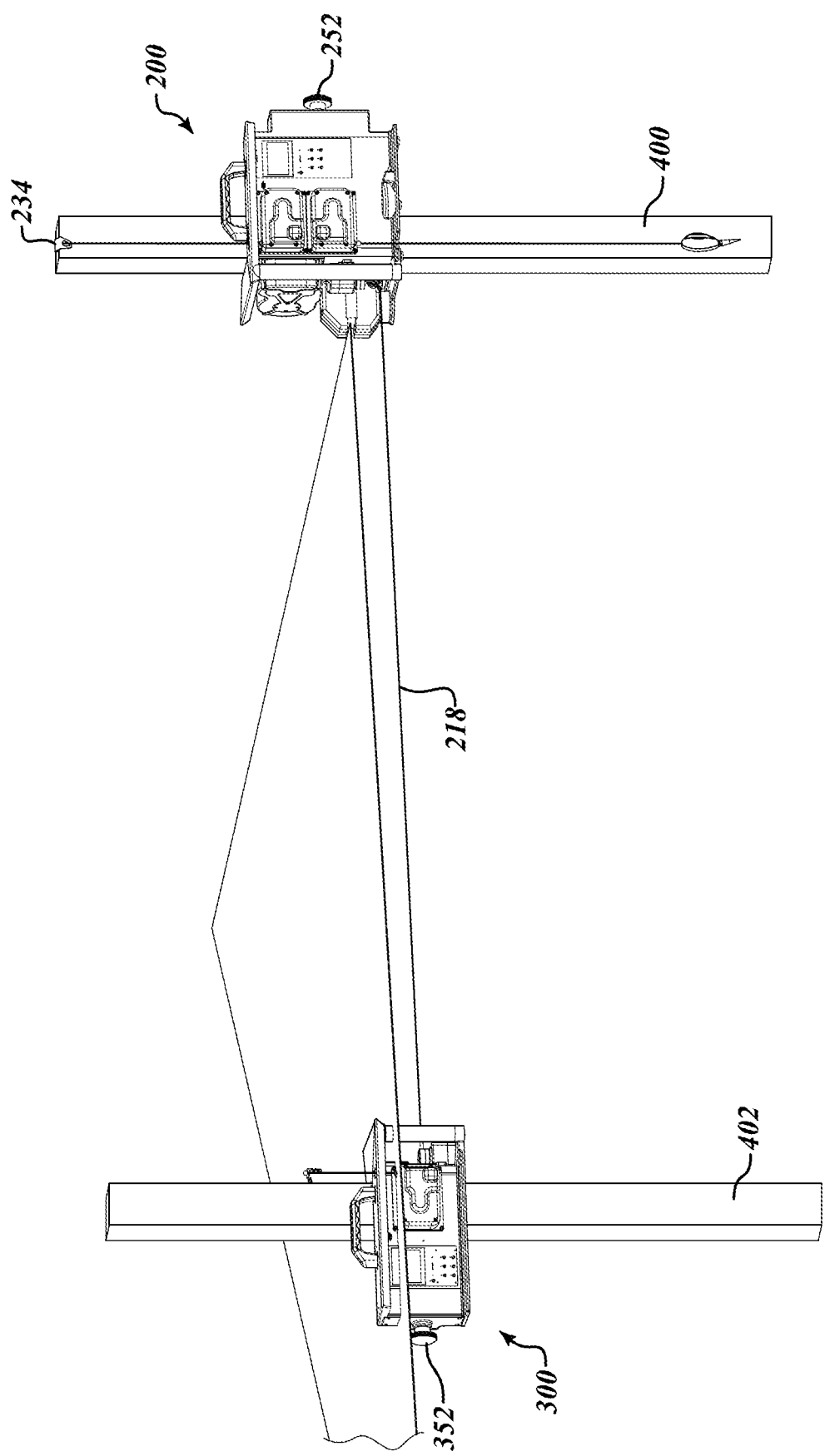
FIG. 14 shows another perspective view of the leading unit of FIGS. 3-5 coupled to the second fence post, the trailing unit of FIGS. 9-11 coupled to the first fence post, and the terminal end portion of the measurement wire of the leading unit coupled to the trailing unit.
Figure 15A:
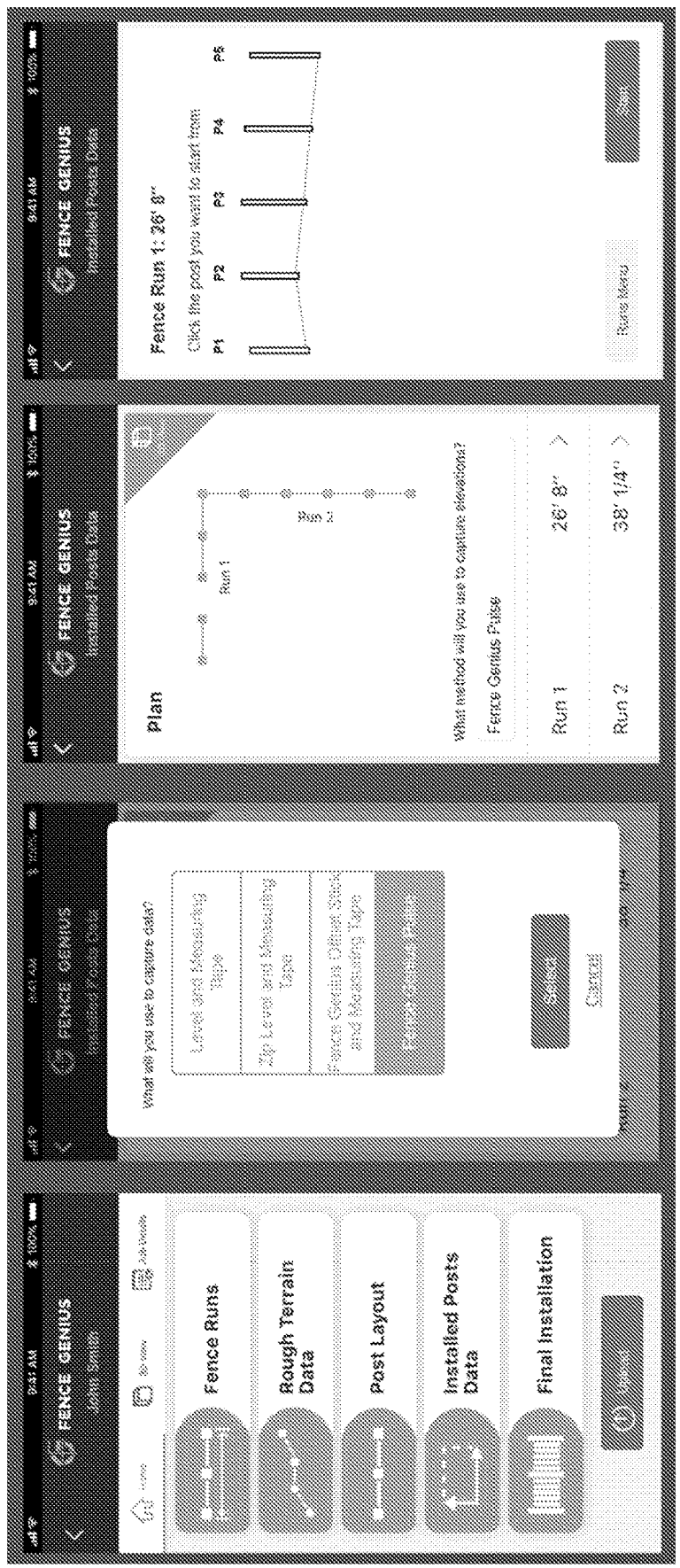
FIGS. 15A-15E illustrate interfaces and flow diagrams for a software system configured for use with the systems and methods described herein, in particular, for use in connection with measuring installed fence posts.
Figure 15B:
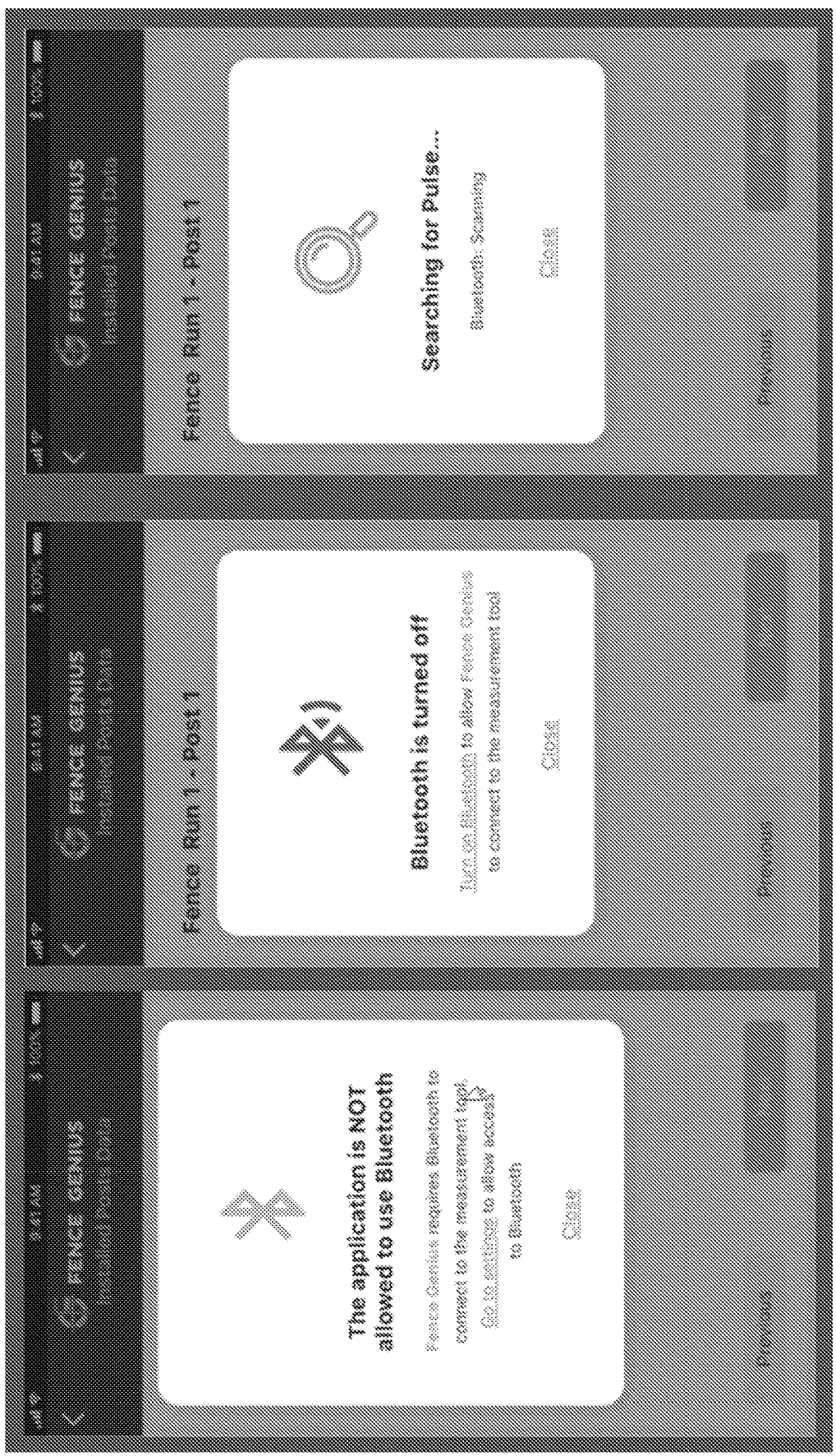
Figure 15C:
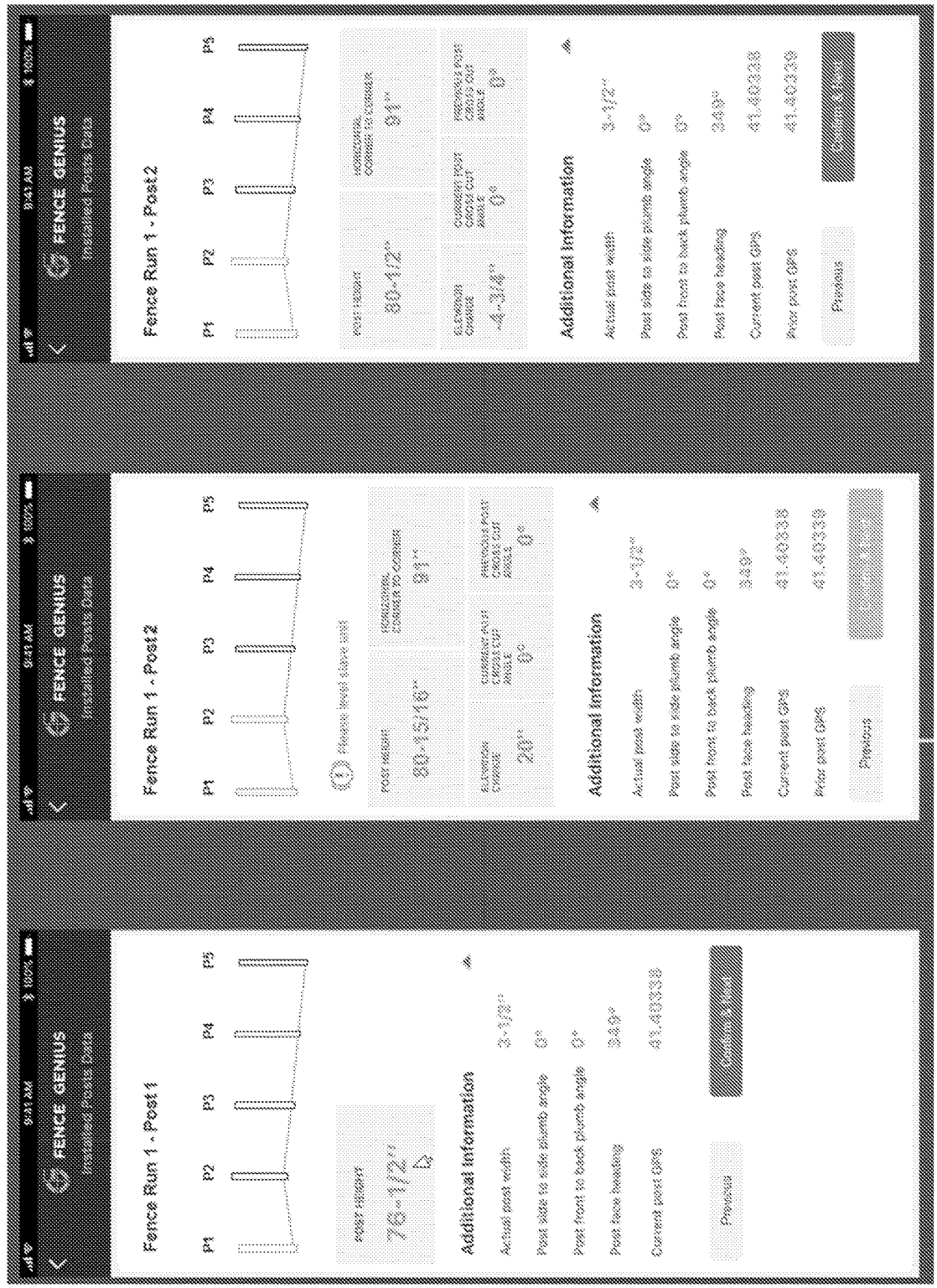
Figure 15D:
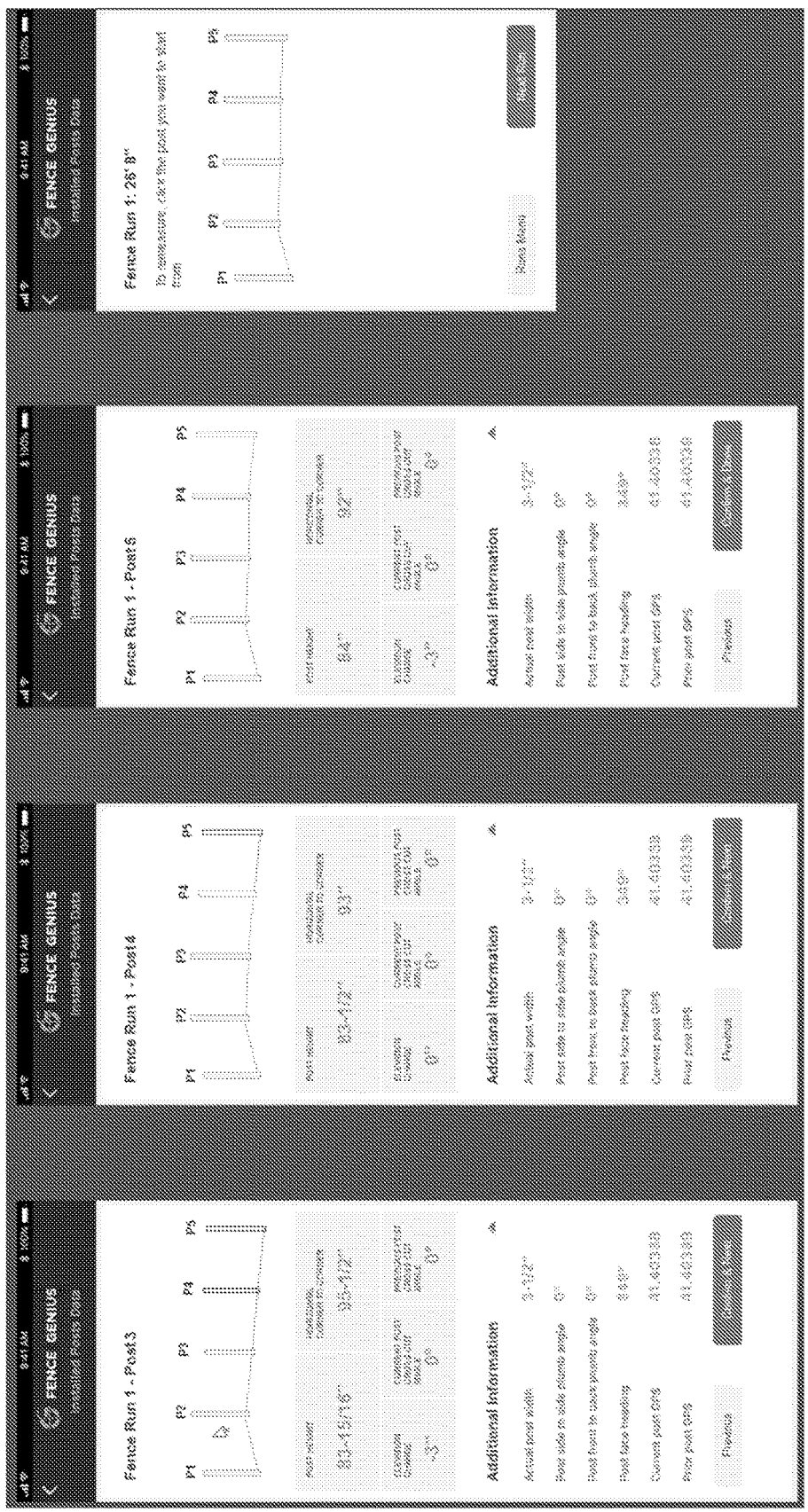
Figure 15E:
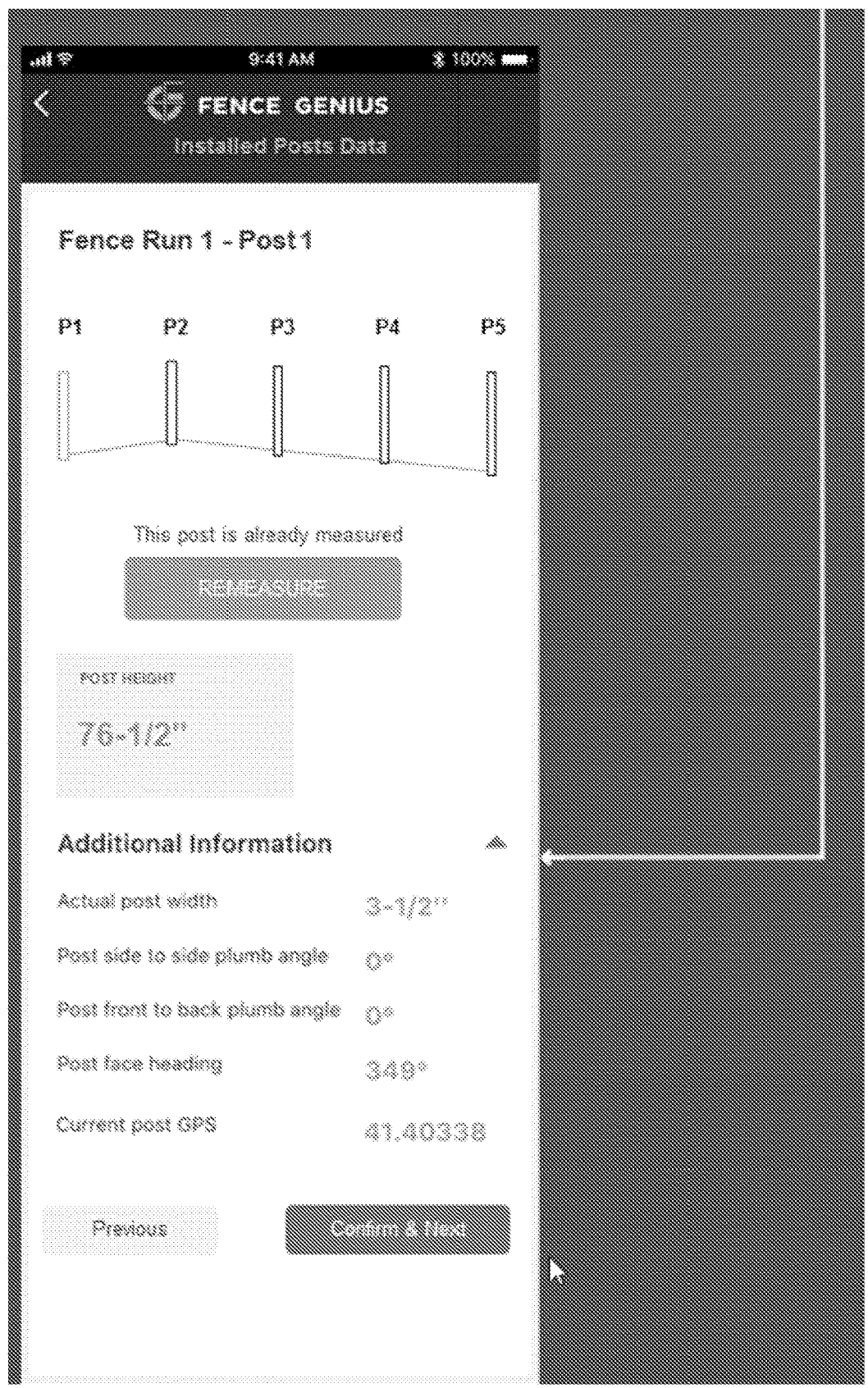
Figure 16A:
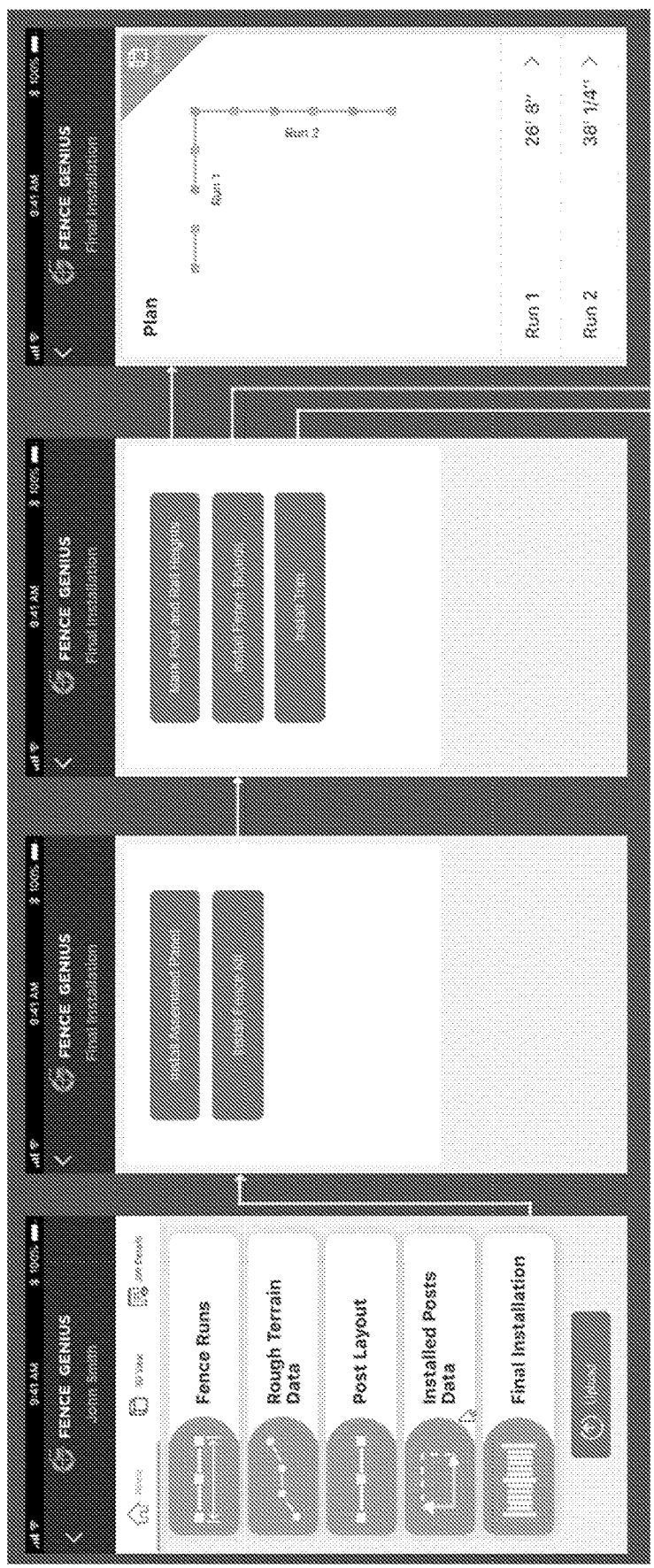
FIGS. 16A-16F illustrate interfaces and flow diagrams for a software system configured for use with the systems and methods described herein, in particular, for use in connection with marking and cutting fence posts and installing fence panels on measured fence posts.
Figure 16B:
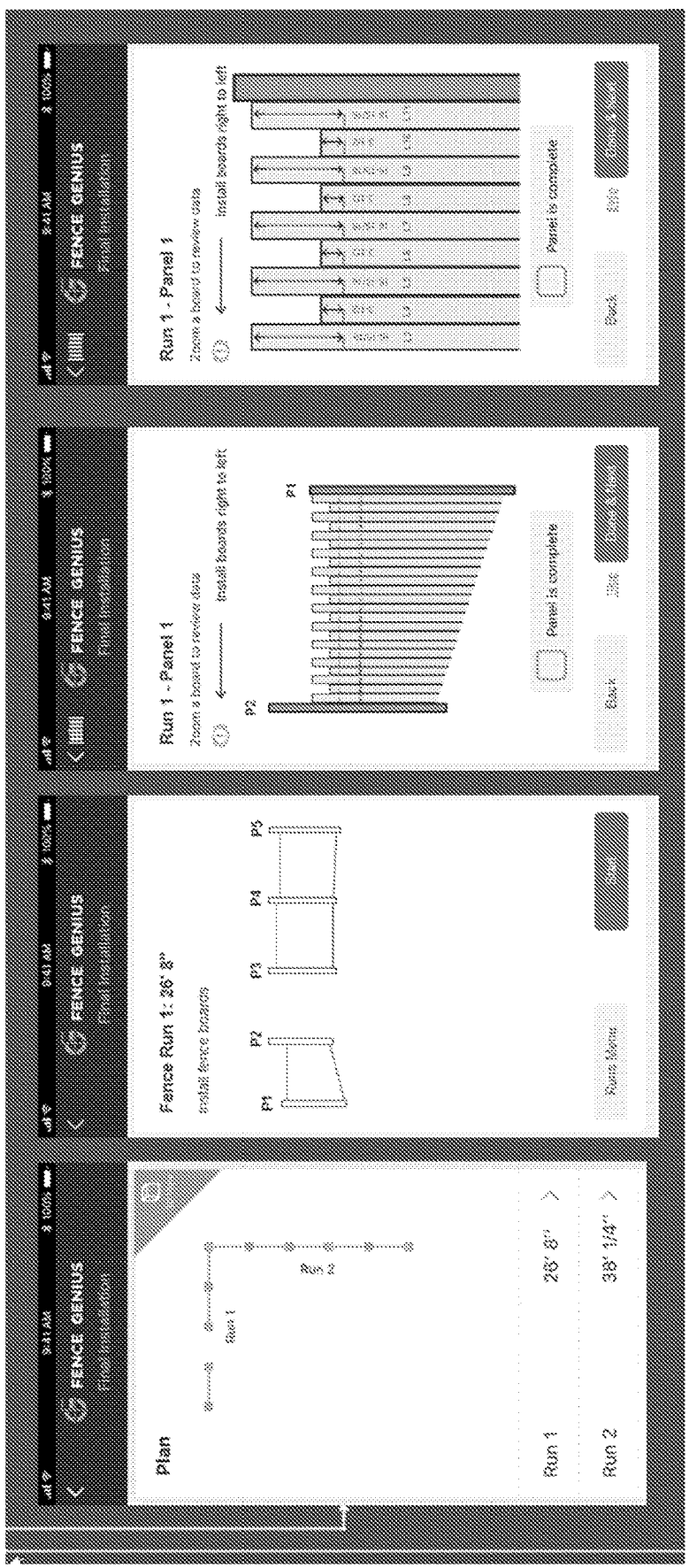
Figure 16C:
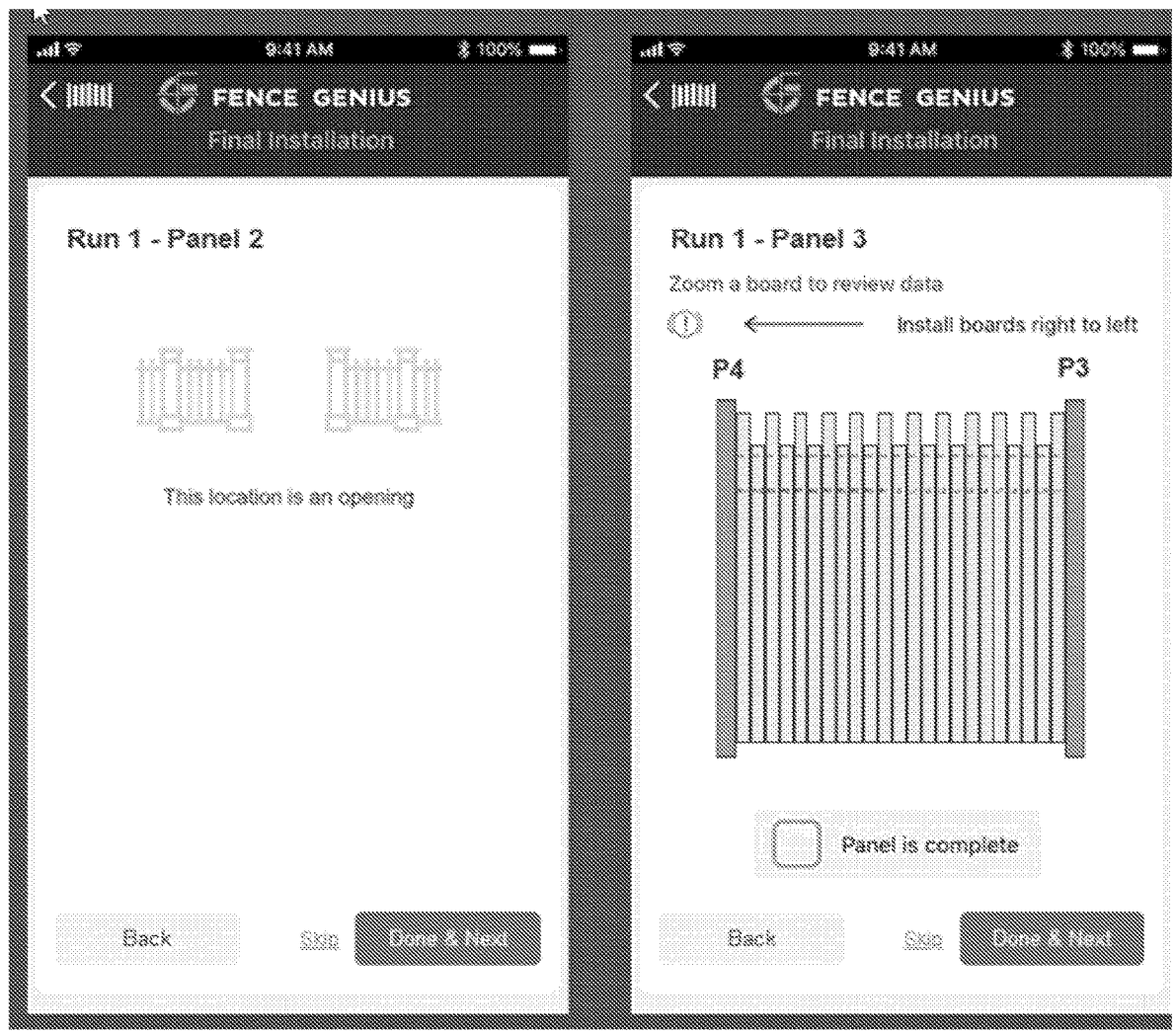
Figure 16D:
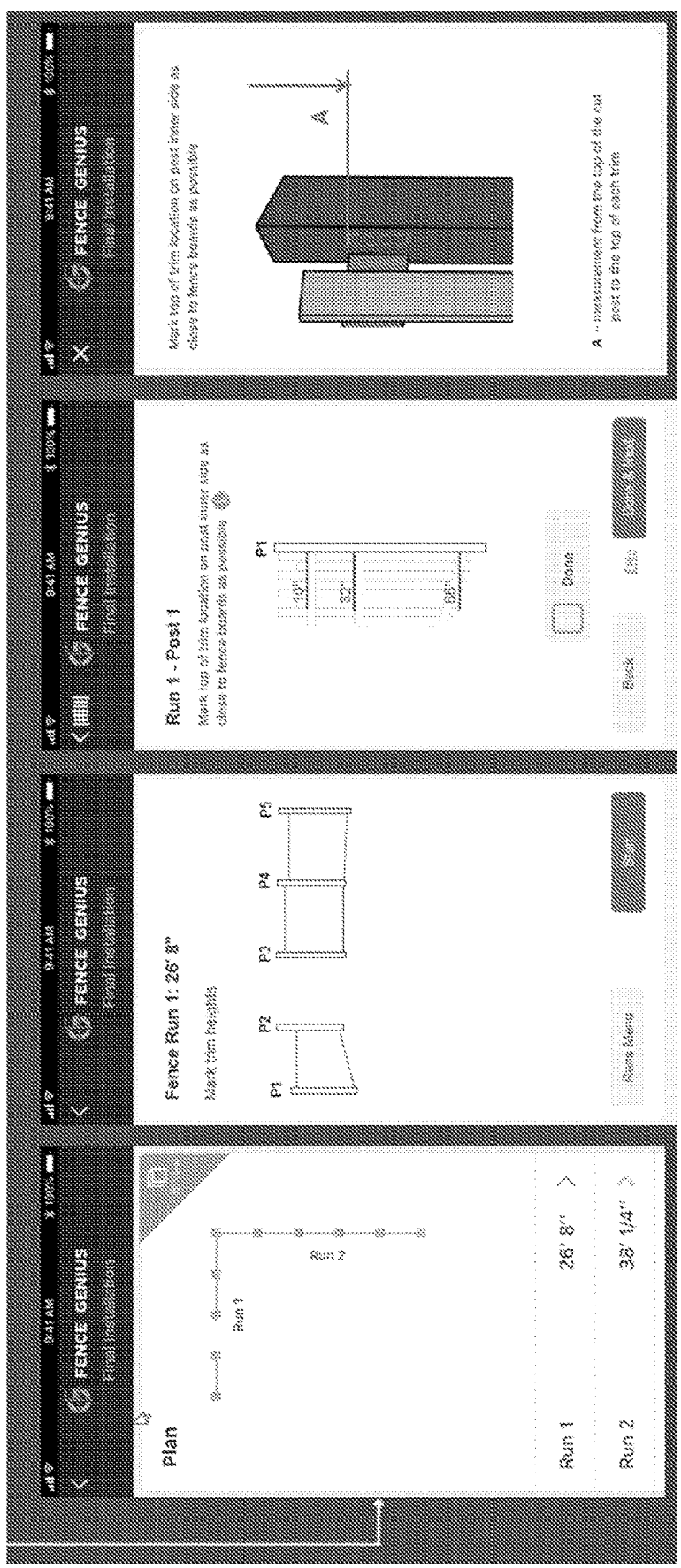
Figure 16E:
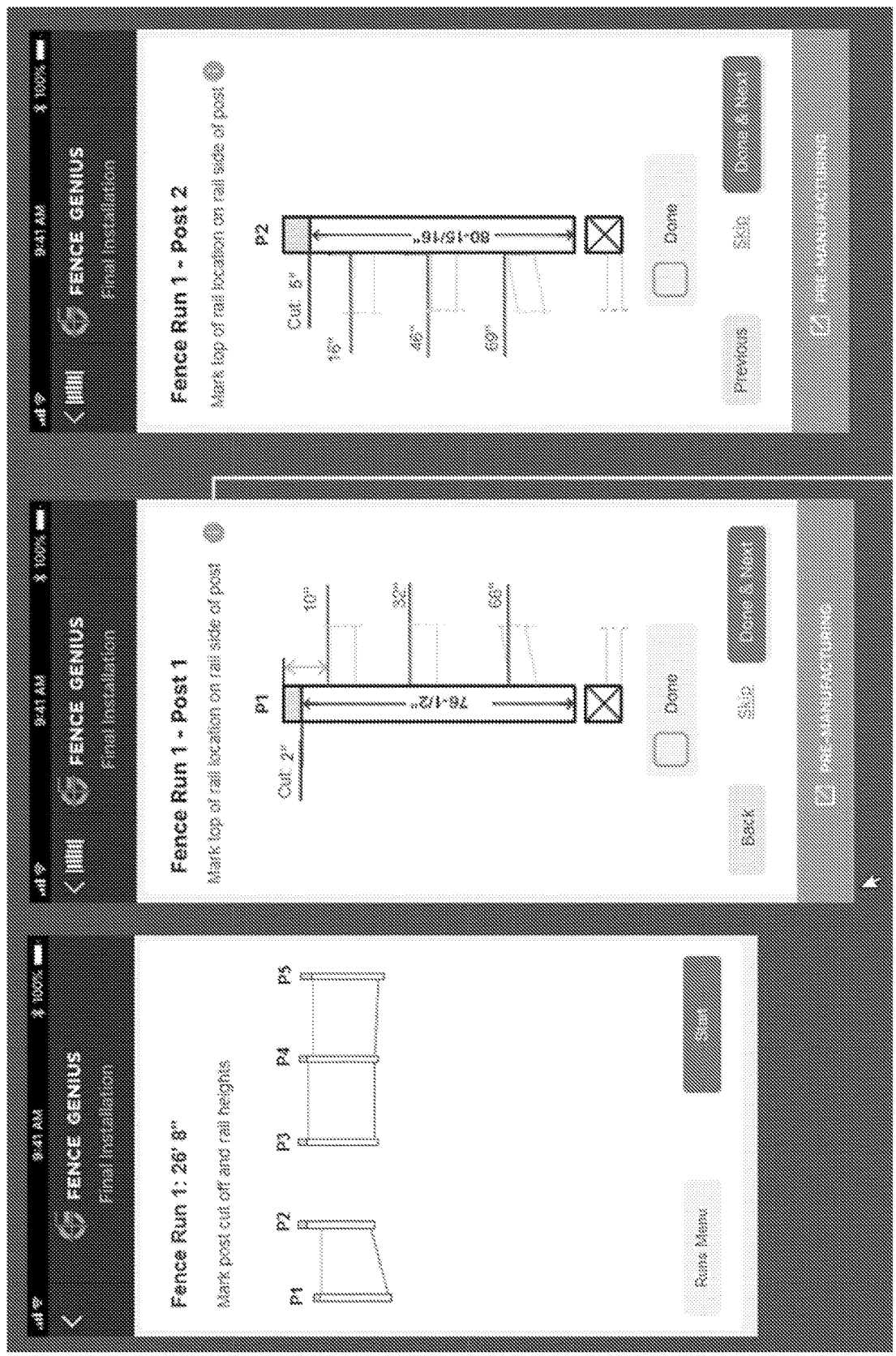
Figure 16F:
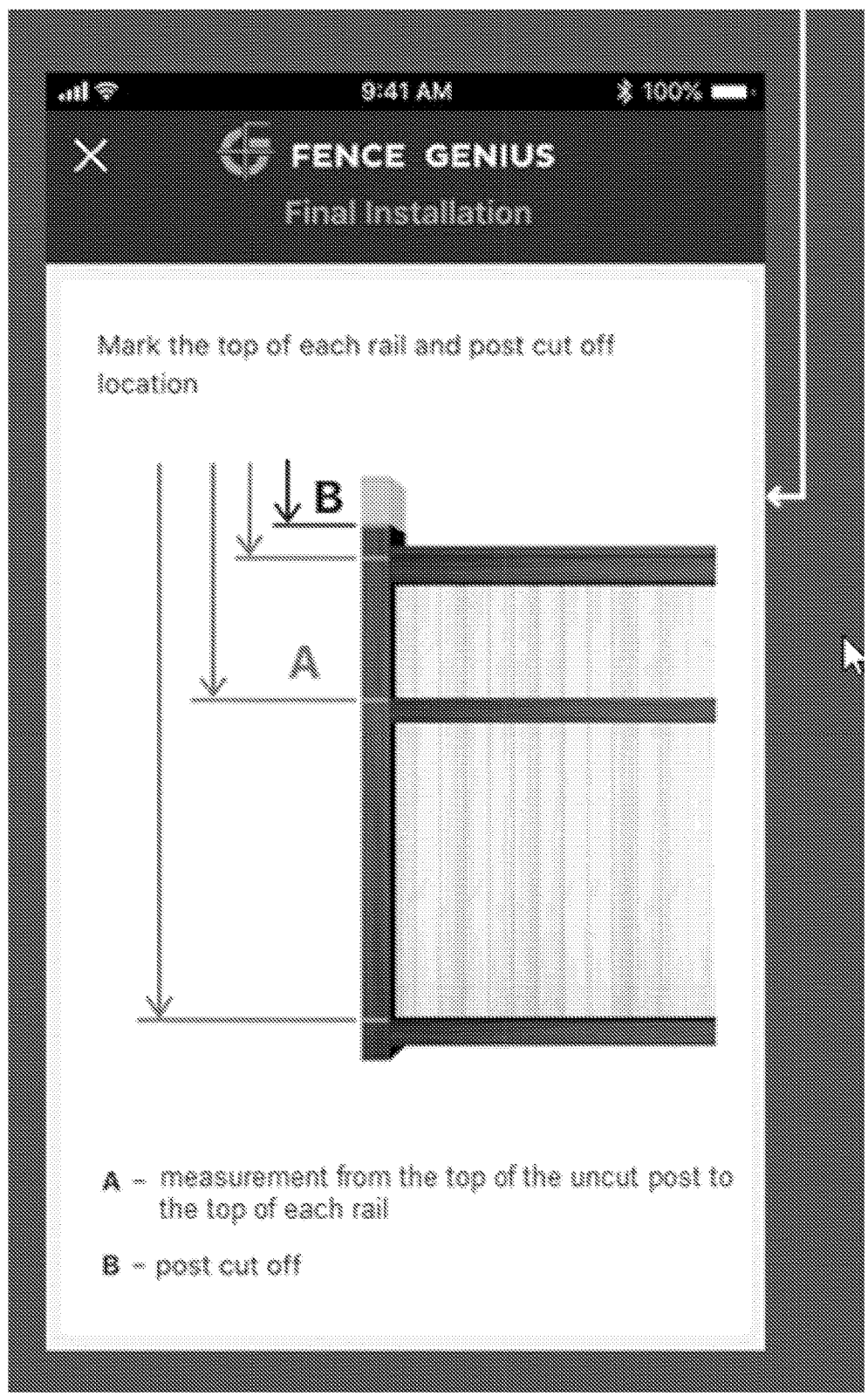

FIGS. 13 and 14 illustrate the leading unit 200 mounted on a second fence post 400 and the trailing unit 300 mounted on a first fence post 402, where the second fence post 400 and the first fence post 402 are adjacent fence posts within a single fence run, and where the leading unit 200 and the trailing unit 300 are in use taking measurements of the second fence post 400 and the first fence post 402. As illustrated in FIGS. 13 and 14, the leading unit 200 is secured to the second fence post 400 by the vise components included therein. In particular, the handle 252 has been rotated to drive sufficient rotation of the screw 248 to move the slide 244 toward the second arm 206 such that the second fence post 400 fits snugly between the sliding jaws 246 (see FIG. 4) of the slide 244 and the second arm 206, and such that the leading unit 200 is mounted snugly on the second fence post 400 by frictional forces between such components. Similarly, the trailing unit 300 is secured to the first fence post 402 by the vise components included therein. In particular, the handle 352 has been rotated to drive sufficient rotation of the screw 348 to move the slide 344 toward the first arm 304 such that the first fence post 402 fits snugly between the sliding jaws 346 (see FIG. 10) of the slide 344 and the first arm 304, and such that the trailing unit 300 is mounted snugly on the first fence post 402 by frictional forces between such components. Further, the distal, terminal end portion of the first measurement wire 218 of the leading unit 200, and the cylindrical body 330 and the spherical body 332 coupled thereto, are secured to the trailing unit 300 within the groove in the upper surface of the rotatable body 322 of the trailing unit.

A measuring system including the leading unit 200 and the trailing unit 300 can be used to take measurements of fence posts within a fence run in accordance with the following methods. First, a user can couple the leading unit 200 to a first fence post, such as the first fence post 402, in accordance with the techniques described elsewhere herein, such that a "front face" of the first fence post is adjacent to and faces toward the first arm 204, such that a "left face" of the first fence post is adjacent to and faces toward the second arm 206, such that a "front, left corner" (i.e., the "reference" corner) of the first fence post is situated at or adjacent to the corner 208 of the main body 202, and such that at least about twelve inches of the fence post 402 extend above the top end of the leading unit 200. The user can then pull the hook 234 and the second measurement wire 226 upward and away from the main body 202 and the third rotary encoder 228 and position the hook 234 on the top of the fence post. The user can then pull the controller 236 and the third measurement wire 230 downward and away from the main body 202 and the fourth rotary encoder 232 and position the front, left corner (i.e., the "reference" corner) of the first fence post within the groove 270 in the main body of the controller 236, and a distal, terminal, pointed end of the conical body 278 of the controller 236 at a height or an elevation corresponding to the lowest desired elevation of any fence panel components to be coupled to the fence post to which the leading unit 200 is coupled (e.g., fence rails or fence boards via fence rails), which may be 2-3 inches above the ground surface.

Once the leading unit 200 is coupled to the first fence post and arranged in such a manner, the user can push the button 272 on the controller 236, which triggers a data capture routine, which may run, in one example, within the computer 242. The sensors described herein, including the various rotary encoders, may be continuously measuring and outputting (that is, constantly producing) data representative of measurements, such as measurements of the lengths of the measurement wires extending from the rotary encoders. During the data capture routine, the computer 242 receives and stores, such as locally, measurements taken by the third rotary encoder 228, indicating a distance from the leading unit 200 to a top end of the first fence post, the fourth rotary encoder 232, indicating a distance from the leading unit 200 to the lowest desired elevation of any fence panel components to be coupled to the fence post to which the leading unit 200 is coupled (e.g., fence rails or fence boards via fence rails), and from the encoder housed within the housing 254, indicating a thickness or a width of the front face of the first fence post. In some alternative implementations, the measurements are continuously received by the computer, and a measurement may be stored once the computer 242 determines, based on the received measurements, that a measurement wire has been pulled to a desired location and then returned to a resting position. In such alternative implementations, such a determination may also trigger the computer 242 or other data collection hardware, software, or routine to log/capture all other measurements or attributes/values including the plumb angles, headings, GPS coordinates, etc.

Under some circumstances, such as when the ground elevation changes rapidly in the vicinity of the fence post (i.e., when there is an extreme grade at such a location), causing there to be different lowest desired elevations of fence panel components on opposing sides of the fence post, the user can then pull the controller 236 and the third measurement wire 230 downward and away from the main body 202 and the fourth rotary encoder 232 and position the front, right corner of the first fence post within the groove 270 in the main body of the controller 236, and a distal, terminal, pointed end of the conical body 278 of the controller 236 at a height or an elevation corresponding to the lowest desired elevation of any fence panel components to be coupled to the fence post to which the leading unit 200 is coupled (e.g., fence rails or fence boards via fence rails), which may be 2-3 inches above the ground surface. The user can then push the button 272 on the controller 236, which triggers a second data capture routine during which the computer 242 receives and stores, such as locally, measurements corresponding to those described above, but with the front, right corner rather than the front, left corner of the first fence post within the groove 270 in the main body of the controller 236.

In some embodiments, the leading unit 200 also includes a compass, which can measure, and output data representative of, a global heading of the front face of the first fence post. In some embodiments, this data can be used to automatically detect when a first fence run has ended and a second fence run has begun, that is, when a fence turns a corner, such as a 90 degree corner. In some embodiments, the leading unit 200 also includes a GPS unit, which can measure, and output data representative of, a global position of the first fence post. In some embodiments, the leading unit 200 also includes a pair of accelerometers, which can measure, and output data representative of, an orientation of the leading unit 200, and thereby of the first fence post, along two orthogonal axes, such as a first horizontal axis parallel to the first arm 204 and/or the front face of the first fence post (i.e., a front-to-back tilt angle) and a second horizontal axis parallel to the second arm 206 and/or the left face of the first fence post (i.e., a left-to-right tilt angle). In some embodiments, this data can allow a software program to design custom fence panels that conform to posts that are out-of-plumb. In some further alternative embodiments, the leading system 200 may include one or more onboard cameras that also capture images of the installation locations of the fence posts to help document the area surrounding the fence posts. Such images may be stamped with location data so they can be related to and maintained with the corresponding measurements. In some embodiments, the data capture routine includes capturing data and measurements from each of these additional sources. In some embodiments, the leading unit 200 provides audible feedback to confirm that the data capture routine is complete. Upon hearing such audible feedback, the user can return all of the measurement wires to their closed, returned, resting, zeroed positions and then remove the leading unit 200 from the first fence post.

Second, the user can remove the leading unit 200 from the first fence post, actuate or activate the laser level unit 216 to generate a level line, and couple the leading unit 200 to a second fence post, such as the second fence post 400, in accordance with the techniques described elsewhere herein, such that a "front face" of the second fence post is adjacent to and faces toward the first arm 204, such that a "left face" of the second fence post is adjacent to and faces toward the second arm 206, such that a "front, left corner" (i.e., the "reference" corner) of the second fence post is situated at or adjacent to the corner 208 of the main body 202, such that at least about twelve inches of the fence post 400 extend above the top end of the leading unit 200, and such that at least about twelve inches of the fence post 402 extend above the level line generated thereon by the laser level unit 216. The user can then pull the hook 234 and the second measurement wire 226 upward and away from the main body 202 and the third rotary encoder 228 and position the hook 234 on the top of the second fence post.

The user can then position the trailing unit 300 such that the level laser line falls on a center-most one of the photodiodes of the photodiode unit 316 (if the level laser line falls on any of the photodiodes, then software can compensate for a slight out-of-level condition. The user can then couple the trailing unit 300 to the first fence post in such a position, in accordance with the techniques described elsewhere herein, such that the front face of the first fence post is adjacent to and faces toward the second arm 306, such that the left face of the first fence post is separated from and faces away from the first arm 304, such that a "right face" of the first fence post is adjacent to and faces toward the first arm 304, and such that a "front, right corner" of the first fence post is situated at or adjacent to the corner 308 of the main body 302. The user can then pull the hook 334 and the measurement wire 326 away from the main body 302 and the second rotary encoder 328 and position the hook 334 on the top of the first fence post. The user can then pull the spherical body 332, the cylindrical body 330, and the first measurement wire 218 away from the main body 202 of the leading unit and the first and second rotary encoders 220, 222, and position the spherical body 332 and the cylindrical body 330 within the groove in the upper surface of the rotatable body 322.

The user can then pull the controller 236 and the third measurement wire 230 downward and away from the main body 202 and the fourth rotary encoder 232 and position the front, left corner (i.e., the "reference" corner) of the second fence post within the groove 270 in the main body of the controller 236, and a distal, terminal, pointed end of the conical body 278 of the controller 236 at a height or an elevation corresponding to the lowest desired elevation of any fence panel components to be coupled to the fence post to which the leading unit 200 is coupled (e.g., fence rails or fence boards via fence rails), which may be 2-3 inches above the ground surface.

Once the leading unit 200 is coupled to the second fence post and the trailing unit 300 is coupled to the first fence post and the leading and trailing units 200, 300 are arranged in such a manner, the user can push the button 272 on the controller 236, which triggers a data capture routine, which may run, in one example, within the computer 242 and/or the computer 342. In some embodiments, the computer 242 and/or the computer 342 prevents running the data capture routine if it detects that the level laser line is not falling on one of the photodiodes of the photodiode unit 316, or on the central photodiode of the photodiode unit 316. During the data capture routine, the computer(s) 242, 342 receive measurements taken by the third rotary encoder 228, indicating a distance from the leading unit 200 to a top end of the second fence post, the fourth rotary encoder 232, indicating a distance from the leading unit 200 to the lowest desired elevation of any fence panel components to be coupled to the fence post to which the leading unit 200 is coupled (e.g., fence rails or fence boards via fence rails), from the encoder housed within the housing 254, indicating a thickness or a width of the front face of the second fence post, and from the encoder housed within the housing 354 (if one is provided), indicating a thickness or a width of the front face of the first fence post.

During the data capture routine, the computer(s) 242, 342 also receive measurements taken by the first rotary encoder 220, indicating an angle of extension of the first measurement wire 218 with respect to the second arm 206 and/or the left face of the second fence post, the second rotary encoder 222, indicating a distance from the leading unit 200 to the trailing unit 300 and/or between the second fence post (or a reference corner thereof adjacent the corner of the leading unit 200) and the first fence post (or a reference corner thereof adjacent the corner of the trailing unit 300), and the first rotary encoder 320, indicating an angle of extension of the first measurement wire 218 with respect to the first arm 304 and/or the right face of the first fence post. During the data capture routine, the computer(s) 242, 342 also receive measurements taken by the second rotary encoder 328, indicating a distance from the trailing unit 300 to a top end of the first fence post.

In some embodiments, the trailing unit 300 also includes a compass, which can measure, and output data representative of, a global heading of the front face of the first fence post. In some embodiments, the trailing unit 300 also includes a GPS unit, which can measure, and output data representative of, a global position of the first fence post. In some embodiments, the trailing unit 300 also includes a pair of accelerometers, which can measure, and output data representative of, an orientation of the trailing unit 300, and thereby of the first fence post, along two orthogonal axes, such as a first horizontal axis parallel to the second arm 306 and/or the front face of the first fence post (i.e., a front-to-back tilt angle) and a second horizontal axis parallel to the first arm 304 and/or the right face of the first fence post (i.e., a left-to-right tilt angle). In some further alternative embodiments, the trailing system 300 may include one or more onboard cameras that also capture images of the installation locations of the fence posts to help document the area surrounding the fence posts. Such images may be stamped with location data so they can be related to and maintained with the corresponding measurements. In some embodiments, the data capture routine includes capturing data and measurements with respect to the first fence post from each of these additional sources, and capturing counterpart data and measurements from the compass, GPS unit, and accelerometers of the leading unit 200 with respect to the second fence post. In some embodiments, the leading unit 200 and/or the trailing unit 300 provide audible feedback to confirm that the data capture routine is complete. Upon hearing such audible feedback, the user can return all of the measurement wires to their closed, returned, resting, zeroed positions and then remove the leading unit 200 from the second fence post and the trailing unit 300 from the first fence post.

These actions can be repeated for any desired number of fence posts, such as for all the fence posts within a fence run or a set of fence runs, such as for all the fence posts encircling a parcel or piece of real estate, e.g., three, four, or five fence runs. For example, the user can remove the leading unit 200 from the second fence post while keeping it connected by the first measurement wire 218 to the trailing unit 300. The leading unit 200 can then be coupled to a third fence post with at least approximately twelve inches of the third post above the leading unit 200 and such that at least about twelve inches of the second fence post extend above the level line generated thereon by the laser level unit 216. The user can then remove the trailing unit 300 from the first post, and install the trailing unit 300 on the second post as described elsewhere herein. As another example, the user can repeat the actions described herein with respect to the first and second fence posts as they work their way around a property in either a clockwise or a counter-clockwise direction as viewed from above. In some embodiments, as the user works their way around the property in this manner, and/or over the course of an entire job or an entire day's work or an entire shift's work, the distal, terminal end of the first measurement wire 218 can remain coupled to the trailing unit 300. For example, the cylindrical body 330 and the spherical body 332 can remain seated within the groove in the top surface of the rotatable body 322.

Once the measurements have been taken, the computer 242 and/or the computer 342 can process the raw data to provide more useful information. For example, the computers 242, 342 can take raw measurements output by each of the encoders and other measuring devices described herein, and combine them with one another, as well as with known dimensions of the components of the leading unit 200 and of the trailing unit 300, to output calculated values for the dimensions of and relationships between the fence posts within the fence run(s), including the heights of each of the fence posts, the elevations of each of the fence posts with respect to one another, the degree to which each of the fence posts tilts about two orthogonal horizontal axes, the distances between the fence posts, the orientations of the side surfaces of each of the fence posts with respect to each other and within a global coordinate system, the dimensions of the fence posts themselves, such as a width or a thickness thereof, and the GPS coordinates of each of the fence posts.

For example, in some implementations, a raw measurement may include a length of a measurement wire extending outward from a rotary encoder, and the computer 242 and/or the computer 342 can process such a raw measurement together with dimensions of the leading unit 200 and/or trailing unit 300, e.g., to calculate a height of a portion of a fence post as a first leg of a triangle a hypotenuse of which is represented by the raw measurement and a second leg of which is represented by dimensions of the leading unit 200 and/or the trailing unit 300. As another example, in some implementations, a "post usable height" may be calculated by adding the calculated vertical components of the second measurement wire 226, the third measurement wire 230, and a known offset distance between the encoders 228 and 232. The leading unit 200 and the trailing unit 300 are collectively equipped with sufficient sensors, as described herein, to allow the computers 242, 342 to also calculate the elevation change of the ground between each pair of adjacent fence posts, or the elevation of the ground at each of the fence posts in absolute and/or global terms. In some embodiments, the leading unit 200 and/or the trailing unit 300 is equipped with additional sensors to supplement such measurements and refine or validate the calculation of the elevation change of the ground between each pair of adjacent fence posts, or the elevation of the ground at each of the fence posts in absolute and/or global terms. As one example, the leading unit 200 and/or the trailing unit 300 may be equipped with Lidar equipment. As another example, the leading unit 200 and/or the trailing unit 300 may be equipped with a wire-transiting scanner configured to transit the first measurement wire 218 and scan the ground between the posts. In such an example, the first measurement wire 218 may carry a greater degree of tension, and other components of the leading unit 200 and the trailing unit 300 may be configured to support such tension, such that the first measurement wire 218 is capable of supporting the scanner as it transits the first measurement wire 218.

In performing such processing, the computers 242, 342 may assume that each of the fence posts is straight, or the computers 242, 342 may recreate or compensate for curvature of the fence posts, such as if they have been mounted on a post at different elevations. Furthermore, in performing such processing, the computers 242, 342 may average redundant measurements. For example, the computers 242, 342 may average the measurements of the tilt angles of each of the fence posts taken by the leading unit 200 and by the trailing unit 300, as well as the measurements of the dimensions of each of the fence posts themselves taken by the leading unit 200 and by the trailing unit 300. In some cases, the computers 242, 342 may also compare such multiple, redundant measurements and provide an alert to the user if they differ from one another by more than a threshold amount, which may be based on an acceptable tolerances for such measurements. Furthermore, in performing such measurements, the computers 242, 342 may use the compass and GPS measurements as secondary measurements, and not incorporate them into other calculations or average them with counterpart measurements taken by other sensors or components of the leading unit 200 or the trailing unit 300. In some cases, the computers 242, 342 may compare the measurements taken by the compasses and/or GPS units to counterpart measurements taken by other sensors or components of the leading unit 200 or the trailing unit 300, and provide an alert to the user if the measurements differ from one another by more than a threshold amount, which may be based on acceptable tolerances for such measurements. In some cases, the measurements taken by the compasses and/or GPS units may be useful in locating the fence posts on a map.

Once the measurements have been taken and such data processing has been performed, the raw data and/or the processed data and calculated dimensions discussed herein may be transmitted from the computers 242, 342 to another computing device, such as a portable computing device such as a laptop, a tablet, a cellular phone, or a "thumbdrive." Such data transmission may be performed in a wired manner, such as over USB, Ethernet, or other data transmission cables, or in a wireless manner, such as over a Bluetooth, WiFi, or other wireless transmission protocol. In some implementations, once such data has been transmitted from the computers 242, 342 to another computing device, the data is transmitted back from the other computing device to the computers 242, 342 to allow for data validation, to verify that the data was properly transferred.

In some embodiments, once the data has been received by the other computing device, the data can be used to calculate or otherwise determine every dimension for every component of every fence panel to be installed on the measured fence posts. Such dimensions can be used to automatically fabricate such components and assemble such fence panels, or can be displayed for use by a human operator fabricating such components and assembling such fence panels. As one example, such dimensions can be used to automatically fabricate complete fence panels off-site, which may be shipped to the location of the measured fence posts for installation thereon. As another example, such dimensions can be used to automatically fabricate complete sets of components for fence panels off-site, which may be shipped to the location of the fence posts for on-site assembly and installation on the measured fence posts. As another example, such dimensions can be used for on-site fabrication of complete sets of components for fence panels and subsequent on-site assembly and installation of the fence panel components on the measured fence posts.

In some implementations, one or more of the sensors or measurement devices or systems described herein may be replaced with other measurement devices or systems, such as laser or lidar measurement devices or systems. For example, the entire trailing unit 300, the laser level unit 216, the first rotary encoder 220, and the second rotary encoder 222 can be replaced by a lidar unit, such as a rotatable lidar unit or lidar unit including rotatable components, that references an outer surface of the leading unit 200 to lidar measurements of the space surrounding the fence post to which the leading unit 200 is coupled, including the space between the fence post to which the leading unit 200 is coupled and an adjacent or neighboring fence post. Such a lidar unit could provide measurements comparable to those provided by the replaced components, as well as assess the contour of the ground between the fence post to which the leading unit 200 is coupled and neighboring fence posts.

Embodiments including lidar components may also incorporate or use a reference object, which may have a well-defined faceted shape (e.g., cubic or diamond-shape) and well-defined dimensions, and which may be positioned on top of or at a known and well-defined position and orientation with respect to a neighboring fence post to assist software in properly mapping, scaling, and otherwise handling the resulting lidar data. As examples, such a reference may sit on top of a fence post, hang by a rigid reference surface hook from the top of a fence post, be clamped to sides of a fence post, and/or be otherwise coupled in any suitable manner to a fence post. Such a reference object may be a multi-faceted target that has facets of known angles and dimensions to enable Lidar to interpolate known target shapes once plural readings are registered on each facet visible to the lidar device. When such measurements are added to and compared with the registered hits of the post body itself, the orientation of the target can establish locations of post corners and a post width. For example, such a reference object may have one or more facets at an angle relative to horizontal like a shed roof (or two angles that come together like a horizontal but very wide V) that would help give the horizontal intersection line relative to the facets that are perpendicular to the post face. This horizontal line where the facets intersect would be a known distance below a top end of the post to which the reference object is coupled, enabling the Lidar to interpolate a height of the fence post. Such a reference object may be referred to as a "hat" to be "worn" by a neighboring fence post. Such features may enhance the capabilities of the systems and methods described herein when used with a lidar device having limited granularity of lidar point data, such as by allowing the systems and methods to more easily establish locations of edges and corners of posts.

As another example, the first measurement wire 218 (and any of the other measurement wires described herein) may be replaced with a ⅛ inch wide, 3/16 inch wide, or other size continuous timing belt coupled to a timing pulley. As another example, the third rotary encoder 228 can be replaced with a straight line laser measurement unit, which could be used in combination with a planar component placed on top of the fence post to which the leading unit 200 is coupled to provide measurements comparable to those provided by the replaced components. As another example, the fourth rotary encoder 232 can be replaced with a straight line laser measurement unit, which could be used in combination with a planar component placed at an elevation or a height corresponding to a lowest desired elevation of any fence panel components to be coupled to the fence post to which the leading unit 200 is coupled (e.g., fence rails or fence boards via fence rails), which may be 2-3 inches above the ground surface, to provide measurements comparable to those provided by the replaced components.

Features and aspects of the various embodiments and implementations described above can be combined to provide further embodiments. These and other changes can be made to the embodiments in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system for measuring fence posts, comprising:
a first measuring unit including a first rotary encoder, a second rotary encoder, and a measurement wire, wherein the measurement wire extends through the first rotary encoder and has a first end that terminates within the second rotary encoder;
a first clamp configured to secure the first measuring unit to a first fence post;
a second measuring unit including a third rotary encoder, wherein the measurement wire has a second end configured to be coupled to the third rotary encoder; and
a second clamp configured to secure the second measuring unit to a second fence post.

2. The system of claim 1 wherein the first measuring unit is a leading unit and the second measuring unit is a trailing unit.

3. The system of claim 1 wherein the first rotary encoder is configured to measure an angle of an axis that extends from the first fence post to the second fence post with respect to an outer surface of the first fence post.

4. The system of claim 1 wherein the second rotary encoder is configured to measure a distance between the first fence post and the second fence post.

5. The system of claim 1 wherein the third rotary encoder is configured to measure an angle of an axis that extends from the first fence post to the second fence post with respect to an outer surface of the second fence post.

6. The system of claim 1 wherein the first measuring unit includes a laser level unit and the second measuring unit includes a photodiode unit.

7. The system of claim 6 wherein the laser level unit and the photodiode unit are configured to determine an elevation of the second measuring unit with respect to the first measuring unit.

8. A system for measuring fence posts, comprising:
a first rotary encoder;
a first measurement wire that has a first end that terminates within the first rotary encoder;
a second rotary encoder; and
a second measurement wire that has a first end that terminates within the second rotary encoder; and
a clamp configured to secure the system to a fence post.

9. The system of claim 8 wherein the first measurement wire has a second end that terminates at a hook.

10. The system of claim 8 wherein the second measurement wire has a second end that terminates at a controller, wherein the controller has a button.

11. The system of claim 10 wherein the controller has a groove configured such that a corner of a fence post can be seated snugly within the groove.

12. The system of claim 8 wherein the clamp includes a slide having at least one sliding jaw.

13. The system of claim 12 wherein the slide is mounted to slide along two guide rods and to be actuated to slide along the two guide rods by a screw.

14. The system of claim 13 wherein the system is configured to measure movement of the slide along the guide rods.

15. A system for measuring fence posts, comprising:
a rotary encoder;
a measurement wire that has a first end that terminates within the rotary encoder; and
a clamp configured to secure the system to a fence post.

16. The system of claim 15 wherein the measurement wire has a second end that terminates at a hook.

17. The system of claim 16 wherein the clamp includes a slide having at least one sliding jaw.

18. The system of claim 17 wherein the slide is mounted to slide along two guide rods and to be actuated to slide along the two guide rods by a screw.

19. The system of claim 18 wherein the system is configured to measure movement of the slide along the guide rods.

20. A method of measuring fence posts, comprising:

clamping a first measuring unit to a first fence post, wherein the first measuring unit includes a first rotary encoder, a second rotary encoder, and a measurement wire, wherein the measurement wire extends through the first rotary encoder and has a first end that terminates within the second rotary encoder;

clamping a second measuring unit to a second fence post, wherein the second measuring unit includes a third rotary encoder, wherein the measurement wire has a second end configured to be coupled to the third rotary encoder; and coupling the second end of the measurement wire to the third rotary encoder.

* * * * *